US011889590B2

(12) United States Patent
Forde et al.

(10) Patent No.: US 11,889,590 B2
(45) Date of Patent: *Jan. 30, 2024

(54) SYSTEM AND METHOD FOR A VIRAL MOLECULAR NETWORK UTILIZING MOBILE DEVICES

(71) Applicant: Attobahn Inc., Ashburn, VA (US)

(72) Inventors: Richard A. Forde, Ashburn, VA (US); Darryl L. Gray, Irvine, CA (US)

(73) Assignee: Attobahn, Inc., Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,431

(22) Filed: May 25, 2021

(65) Prior Publication Data

US 2022/0117035 A1    Apr. 14, 2022

Related U.S. Application Data

(63) Continuation of application No. 15/936,369, filed on Mar. 26, 2018, now Pat. No. 11,050,717, which is a continuation-in-part of application No. 14/895,652, filed as application No. PCT/US2014/040933 on Jun. 4, 2014, now Pat. No. 10,021,735.

(60) Provisional application No. 62/476,555, filed on Mar. 24, 2017, provisional application No. 61/830,701, filed on Jun. 4, 2013.

(51) Int. Cl.
| | |
|---|---|
| H04W 84/00 | (2009.01) |
| H04W 12/03 | (2021.01) |
| H04J 3/06 | (2006.01) |
| H04L 9/40 | (2022.01) |
| H04B 1/3888 | (2015.01) |
| H04L 12/46 | (2006.01) |
| H04L 12/40 | (2006.01) |

(52) U.S. Cl.
CPC ........ H04W 84/005 (2013.01); H04B 1/3888 (2013.01); H04J 3/06 (2013.01); H04L 12/4633 (2013.01); H04L 63/0428 (2013.01); H04W 12/03 (2021.01); *H04L 12/40* (2013.01)

(58) Field of Classification Search
CPC .. H04B 1/3888; H04J 3/06; H04J 2203/0091; H04L 63/0428; H04L 12/4633; H04W 12/03; H04W 84/005; H04W 74/04
USPC ......................................................... 370/345
See application file for complete search history.

(56) References Cited

U.S. PATENT DOCUMENTS

| | | | | |
|---|---|---|---|---|
| 6,005,865 A | * | 12/1999 | Lewis ................ | H04L 12/6418 370/398 |
| 6,621,830 B1 | * | 9/2003 | Semple ............. | H04Q 11/0478 370/468 |

(Continued)

*Primary Examiner* — Robert J Lopata

(57) ABSTRACT

The present disclosure is directed to the Viral Orbital Vehicle, called the V-ROVER which is one of the access devices of the Viral Molecular Network that is a high speed, high capacity terabits per second (TBps) LONG-RANGE Millimeter Wave (mmW) wireless network that has an adoptive mobile backbone and access levels. The V-ROVER is one of the devices of the Viral Molecular Network's three-tier infrastructure molecular system connectivity architecture that transports voice, data, video, studio quality and 4K/5K/8K ultra high definition Television (TV) and multimedia information. The V-ROVER is one of the access node communications devices that makes up the Access Network Layer (ANL) of the Attobahn Viral Molecular Network.

15 Claims, 21 Drawing Sheets

(56) References Cited

U.S. PATENT DOCUMENTS

| | | | | |
|---|---|---|---|---|
| 6,778,503 B1* | 8/2004 | Sproat | H04J 3/12 | 370/352 |
| 6,954,461 B1* | 10/2005 | Tomlins | H04L 12/5601 | 370/395.5 |
| 7,075,952 B1* | 7/2006 | Torma | H04J 3/1623 | 370/545 |
| 7,242,686 B1* | 7/2007 | Dougherty | H04L 49/106 | 370/498 |
| 7,583,599 B1* | 9/2009 | Ling | H04J 3/1617 | 370/476 |
| 2002/0075854 A1* | 6/2002 | Kumar | H04Q 11/0005 | 370/465 |
| 2002/0138646 A1* | 9/2002 | Tsuboi | H04Q 11/0478 | 709/249 |
| 2003/0147379 A1* | 8/2003 | Elias | H04J 3/1617 | 370/465 |
| 2003/0174714 A1* | 9/2003 | Manik | H04L 69/22 | 370/398 |
| 2005/0030982 A1* | 2/2005 | Eshraghian | H04L 12/5601 | 370/545 |
| 2006/0262888 A1* | 11/2006 | Mathew | G06F 1/04 | 375/355 |
| 2006/0264210 A1* | 11/2006 | Lovberg | H04W 92/20 | 455/422.1 |
| 2006/0268832 A1* | 11/2006 | Mekala | H04L 12/4633 | 370/352 |
| 2006/0268888 A1* | 11/2006 | Liu | H04L 12/5601 | 370/466 |
| 2008/0037581 A1* | 2/2008 | Asano | H04J 3/1629 | 370/466 |
| 2008/0253491 A1* | 10/2008 | Keezer | G06F 1/04 | 375/371 |
| 2008/0298806 A1* | 12/2008 | Effenberger | H04J 14/0226 | 398/98 |
| 2009/0196277 A1* | 8/2009 | Horn | H04J 3/0679 | 370/350 |
| 2009/0276542 A1* | 11/2009 | Aweya | H03L 7/08 | 709/248 |
| 2010/0290783 A1* | 11/2010 | Kazawa | H04Q 11/0067 | 398/66 |
| 2011/0044176 A1* | 2/2011 | Li | H04L 12/56 | 370/315 |
| 2011/0066297 A1* | 3/2011 | Saberi | H04Q 9/00 | 700/287 |
| 2011/0105159 A1* | 5/2011 | Hirayama | H04W 4/14 | 455/466 |
| 2012/0315031 A1* | 12/2012 | Zhong | H04Q 11/00 | 398/8 |
| 2013/0028264 A1* | 1/2013 | Munoz | H04L 47/2483 | 370/395.6 |
| 2013/0266029 A1* | 10/2013 | Yi | H04L 49/10 | 370/535 |
| 2013/0287017 A1* | 10/2013 | Chen | H04L 49/253 | 370/355 |
| 2014/0119080 A1* | 5/2014 | Sakamoto | H02M 7/493 | 363/95 |
| 2014/0121795 A1* | 5/2014 | Snow | H04N 21/4305 | 700/94 |
| 2014/0203963 A1* | 7/2014 | Shimada | G04R 40/02 | 342/357.51 |
| 2014/0219132 A1* | 8/2014 | Delveaux | H04L 12/4035 | 370/254 |
| 2015/0146730 A1* | 5/2015 | Desai | H04L 12/46 | 370/392 |
| 2016/0262144 A1* | 9/2016 | Kitazoe | H04L 5/0057 | |
| 2016/0352344 A1* | 12/2016 | Maki | H03L 1/04 | |
| 2017/0164368 A1* | 6/2017 | Nishikawa | H04B 7/0695 | |
| 2017/0187384 A1* | 6/2017 | Shimada | H03B 17/00 | |
| 2018/0246216 A1* | 8/2018 | Shiina | G01S 19/23 | |
| 2020/0314760 A1* | 10/2020 | Ye | H04W 52/10 | |
| 2020/0374205 A1* | 11/2020 | Sharma | H04L 67/12 | |

* cited by examiner

ATTOBAHN ATTOVIEW SERVICES DASHBOARD

Viral Orbital Vehicle Access Node PHYSICAL LAYOUT

Attobahn Atto Second Multiplexer (ASM)
Orbital Time Slots & Time Division Frame

V-ROVER, Nano-ROVER, Atto-ROVER, PROTONIC SWITCH & NUCLEUS SWITCH

SYSTEM AND METHOD FOR A VIRAL MOLECULAR NETWORK UTILIZING MOBILE DEVICES

RELATED APPLICATIONS

This application claims the benefit of U.S. non-provisional patent application Ser. No. 15/936,369 entitled "Viral Molecular Network Architecture and Design" filed on Mar. 26, 2018, which is a continuation-in-part of U.S. non-provisional patent application Ser. No. 14/895,652 entitled "Viral Molecular Network Architecture and Design" filed on Dec. 3, 2015, which claims priority to WIPO PCT patent application no. PCT/US14/40933 entitled "Viral Molecular Network Architecture and Design" filed on Jun. 4, 2014, which claims priority to U.S. provisional patent application No. 61/830,701 filed on Jun. 4, 2014, all of which are commonly owned, the disclosures of which are incorporated herein by reference in its entirety.

TECHNICAL FIELD

The current Internet worldwide network is based on technologies developed more than a quarter century ago. The primary part of these technologies is the Internet Protocol-Transmission Control Protocol/Internet Protocol (TCP/IP) transport router systems that functions as the integration level for data, voice, and video. The problem that has plagued the Internet is its inability to properly accommodate voice and video with the high-quality performance that these two applications require in order for human interaction. The varying length packet sizes, long router nodal delays, and dynamic unpredictable transport routes of IP routers result in extended and varying latency.

This unpredictability, prolonged and unsteady latency has a negative effect on voice and video applications, such as poor-quality voice conversations and the famous "buffer" wheel as the end user wait on the video clip or movie to download. In addition to the irritating choppy voice calls, interruption of videos and movies as they play, and the jerking movement of pictures during video conferencing, these problems are compounded with the narrowband architecture of IP to move the new 4K/5K/8K ultra high definition television signals, studio quality real-time news reporting and real-time 3D Ultra High Definition video/interactive stadium sporting (NFL, NBA, MLB, NHL, soccer, cricket, athletics events, tennis, etc.) environments.

Also, high resolution graphics and corporate mission critical applications suffer the same fate as the services and applications when traversing the Internet TCP/IP network. The deficiencies of IP routing on these very popular applications have resulted in a worldwide Internet that delivers inconsistent service qualities for both consumers and businesses. The existing Internet network can be categorized as a low-quality consumer network that was originally designed for narrow band data and not to carry high capacity voice, video, interactive video conferencing, real-time TV news reporting and streaming video, high capacity mission critical corporate operational data, or high-resolution graphics in a dynamic environment. The Internet infrastructure worldwide has evolved from the major industrial nations to small developing countries with a litany of network performance inconsistency and a multiplicity of quality issues.

The hardware and software manufacturers of IP based networks has cobbled together a series of mismatch hardware and technologies over the years as the miniaturizing computing world of devices rapidly migrated to the billions of human masses, resulting in an expeditious immigration of wireless devices to accommodate the great mobility of mankind and their way of interacting with their newly technological experience.

All of the aforementioned dynamics of the technological world, plus the economies of scale and scope that computing processing and memory have afforded; the layering and simplicity of software coding have created the new world of apps that used to be controlled and constricted under Microsoft, whereby literally tens of thousands of these apps are developed every year; and the vast array of consumer computing devices and uses have resulted in the worldwide hunger for bandwidth and speed beyond light range. While this category five (5) tornado-like, consumer technological revolution decimates the worldwide Internet, the Local Exchange Carriers (LECs), Inter-Exchange Carriers (IXCs), International Carriers (ICs), Internet Services Providers (ISPs), Cable Providers, and network hardware manufacturers are scrambling to implement and develop band aid solutions such as Long Term Evolution (LTE) and 5G cell telephone based networks and IP networking hardware, to squelch the 250 miles per hour masses technological tornado.

The current Internet communications networks transport voice, data, and video in TCP/IP packets which are encapsulated in Local Area Network layer two MAC frames and then placed into frame relay or Asynchronous Transfer Mode (ATM) protocol to traverse the wide area network. These series of standard protocols add a tremendous amount of overhead to the original data information. This type of network architecture creates inefficiencies which result in poor network performance of wide bandwidth video and multimedia applications. It is these highly inefficient protocols that dominate the Internet, Inter-Exchange Carriers (IXC), Local Exchange Carriers (LEC), Internet Service Providers (ISP), and Cloud based service provider network architectures and infrastructures. The net effect is an Internet that cannot meet the demands of the voice, video and the new high capacity applications and advancement in 4K/5K/8K ultra high definition TV with high quality performance.

Another problem that affects the distribution of high capacity, wide-bandwidth service is the high cost of running fiber optics cables to the homes. Many technology visionaries have recognized that wide-bandwidth wireless services are the correct solution to replace local access fiber services to the homes. The issue with wireless solutions is that the existing microwave spectrum is congested. Therefore, telecommunications companies and Internet Services Providers (ISPs) have turned they attention to Millimeter Wave (mmW) transmission technologies.

The problem with mmW transmission is the RF signal deterioration over very short distances due to atmospheric conditions. The Wireless LAN IEEE 802.11ad WiGi technology is one attempt to address the bandwidth crunch problem but this technology is limited to the local area of a room or the confines of building and cannot provide communications services over long distances. Therefore, there is a need for a wide-bandwidth mmW transmission solution that extends the RF transmission distances of these frequencies between 30 to 300 GHz and higher frequencies to meet the demands of the voice; video; new high capacity applications; and advancement in 4K/5K/8K ultra high definition TV with high quality performance. Attobahn Millimeter (mmW) Radio Frequency (RF) Architecture provides the mmW transmission technology solution to support the aforementioned services and extend the RF transmission distances of these frequencies between 30 to 3300 GHz.

In the past, others have attempted to address the Internet performance problems by enhancing the TCP/IP, IEEE 802 LAN, ATM and TCP/IP heavily-layered standards and utilizing additional protocols with the adoption of Voice Over IP, video transport, and streaming video using a patch work of protocols such Real Time Protocol (RTP), Real Time Streaming Protocol (RTSP), and Real Time Control Protocol (RTCP) running over IP. Some developers and network architects designed various approaches to address more narrow solutions such as U.S. Pat. No. 5,440,551 discloses a multimedia packet communication system for use with an ATM network wherein connections could be selectively used automatically and dynamically in accordance with qualities required by an application, in which a plurality of communications of different required qualities are involved to set quality classes. However, the use of the ATM standard cell frame format and connection-oriented protocol does not alleviate the issues of the heavily, layered standard.

Therefore, there remains a need for a mobile end-user wireless device that provides access into the high-speed, high capacity network system for wireless transmission of 4K/5K/8K ultra high definition video, studio quality TV, fast movies download, 3D live video streaming virtual reality broadband data, real-time kinetic video games multimedia, real-time 3D Ultra High Definition video/interactive stadium sporting (NFL, NBA, MLB, NHL, soccer, cricket, athletics events, tennis, etc.) environments, high resolution graphics, and corporate mission critical applications.

BRIEF SUMMARY OF THE DISCLOSURE

The present disclosure is directed to the Viral Orbital Vehicle, called the V-ROVER which is one of the access devices of the Viral Molecular Network that is a high speed, high capacity terabits per second (TBps) LONG-RANGE Millimeter Wave (mmW) wireless network that has an adoptive mobile backbone and access levels. The V-ROVER is one of the devices of the Viral Molecular Network's three-tier infrastructure molecular system connectivity architecture that transports voice, data, video, studio quality and 4K/5K/8K ultra high definition Television (TV) and multimedia information.

The V-ROVER is one of the access node communications devices that makes up the Access Network Layer (ANL) of the Attobahn Viral Molecular Network.

The Access Network Layer (ANL) V-ROVER mobile devices of the network are transported (mobile) by vehicles and persons as the network operates. This network arrangement differs from cellular telephone networks operated by the carriers, in the sense that the cellular networks are operated from stationary locations (the towers and switching systems are at fixed locations) and it is the end users who are mobile (cell phones, tablets, laptops, etc.) and not the networks. In the case of the Viral Molecular Network, the entire ANL and PSL are mobile because their network devices are in cars, trucks, trains, and on people who are moving, a true mobile network infrastructure. This capability of the V-ROVER mobile devices makes Viral Molecular network a clear distinction when compared to the existing mobile networks.

Access Network Layer—V-Rover

The Viral Orbital Vehicle Architecture V-ROVERs

The Access Network Layer (ANL) consists of the Viral Orbital Vehicle (V-ROVER) that is the touch point of the network for the customer. The V-ROVERs collect the customer information streams in the form of voice; data; and video directly from WiFi and WiGi and WiGi digital streams; HDMI; USB; RJ45; RJ45; and other types of high-speed data and digital interfaces. The received customers' information streams are placed into fix size cell frames (60 bytes payload and 10-byte header) which are then placed in Time Division Multiple Access (TDMA) orbital time-slots (OTS) functioning in the atto-second range. These OTS are interleaved into an ultra-high-speed digital stream operating in the terabits per second (TBps) range. The WiFi and WiGi interface of the Viral Orbital Vehicle (V-ROVERs) is via an 802.11b/g/n antenna.

Viral Orbital Vehicle (V-ROVERs, Nano-ROVERS, and Atto-ROVERs) Atto-Second Multiplexer (ASM)

The Viral Orbital Vehicle (V-ROVERs) is architected with the IWIC chip that basically provides the cell-based framing of all information signal that enters the ports of the device. The cell frames from each port is placed into the orbital time-slots at a very rapid rate and then interleaved in an ultra-high-speed digital stream. The cell frames use a very low overhead frame length and is assigned its designated distant port at the Protonic Switching Node (PSL). The entire process of framing the ports' data digital streams and multiplexing them into TDMA atto-second time-slots is termed Atto-Second Multiplexing (ASM).

Viral Orbital Vehicle Ports Interfaces

The Viral Orbital Vehicle (V-ROVER) ports can accept high-speed data streams, ranging from 64 Kbps to 10 GBps from Local Area Network (LAN) interfaces which is not limited to a USB port; and can be a high-definition multimedia interface (HDMI) port; an Ethernet port, a RJ45 modular connector; an IEEE 1394 interface (also known as FireWire) and/or a short-range communication ports such as a WiFi and WiGi; Bluetooth; Zigbee; near field communication; or infrared interface that carries TCP/IP packets or data streams from the Viral Molecular Network Application Programmable Interface (AAPI); Voice Over IP (VOIP); or video IP packets.

The Viral Orbital Vehicle (V-ROVERs) is equipped (always port 1) with a WiFi and WiGi capability to accept WiFi and WiGi devices data streams and move their data across the network. The WiFi and WiGi port acts as a hotspot access point for all WiFi and WiGi devices within its range. The WiFi and WiGi input data is converted into cell frames and are passed into the OTS process and subsequently the ASM multiplexing schema.

The Viral Orbital Vehicle (V-ROVERs) does not read any of its port input data stream packet headers (such as IP or MAC addresses), it simply takes the data streams and chop them into the 70-byte cell frames and transports the raw data from its input to the terminating Viral Orbital Vehicle end port that delivers it to the designated terminating network or system. The fact that the Viral Orbital Vehicle does not spent time reading information stream packet header bits or trying to route these data streams based on IP or some other packet framing methodology, means that there is an infinitesimal delay time through the access Viral Orbital Vehicle ASM.

Viral Orbital Vehicle (V-ROVERs) ASM Switching Function

The Viral Orbital Vehicle (V-ROVER) also acts as transit switching device for information (voice, video, and data) that is not designated for one of its ports. The device constantly reads the cell frame header for its port designation addresses. If it does not see any of its Designation address in the ROVER Designation frame headers, then it simply passes on all cells to one of its wide area ports which transit the digital streams to its neighboring Viral Orbital Vehicle. This quick look up arrangement of the ROVER networking technique once again reduces the transit delay times through the devices and subsequently throughout the entire Viral network. These reduced overhead frames and lengths of the overhead frames, combined with the small fixed size cell process and the fixed hard-wired channel/time-slot TDMA ASM multiplexing technique reduces latency through the devices and increased data speed throughput in the network.

The Viral Orbital Vehicle is always adopted by a primary Protonic Switch at the Protonic Switching Layer in the network molecule that it is located. The Viral Orbital Vehicle selects the closest Protonic Switch as its primary adopter within the minimum five-mile radius. At the same time the VIRAL ORBITAL VEHICLE (V-ROVER) selects the next nearest Protonic Switch as its secondary adopter, so that if its primary adopter fails it automatically pumps all of its upstream data to its secondary adopter. This process is carried out transparently to all user traffic originating, terminating, or transiting the VIRAL ORBITAL VEHICLE. Thus, there is no disruption to the end user traffic during failures in the network at this layer. Hence this viral adoption and resiliency of the Viral Orbital Vehicle (V-ROVER) and their Protonic Switch adopters provides a high-performance networking environment.

These design and networking strategies built into the network, starting from its access layer is what makes the Viral Molecular Network the fastest data switching and transport network and separates it from other networks, such as 5G and numerous types common carriers' and corporate networks.

Viral Orbital Vehicle (V-ROVER) Radio Frequency System

The Viral Orbital Vehicle (V-ROVER) transmission schema is based on high frequency electromagnetic radio signals, operating at the ultra-high end of the microwave band. The frequency band is in the order of 30 to 3300 gigahertz range, at the upper end of the microwave spectrum and into the infrared spectrum. This band allocation is outside of the FCC restricted operating bands, thus allowing the Viral Molecular Network to utilize a wide bandwidth for its terabits digital stream. The RF section of the Viral Orbital Vehicle uses a broadband 64-4096-bit Quadrature Amplitude Modulation (QAM) modulator/demodulator for its Intermediate Frequency (IF) into the RF transmitter/receiver. The power transmission wattage output is high enough for the signal to be receive with a decibel (dB) level that allows the recovered digital stream from the demodulator to be within a Bit Error Rate (BER) range of 1 part that is one bit error in every trillion bits. This ensures that the data throughput is very high over a long-term basis.

The V-ROVER RF section will modulate four (4) digital streams running at 40 giga bits per second (GBbs) each, with a full throughput of 160 GBps. Each of these four digital streams will be modulated with the 64-4096-bit QAM modulator and converted into IF signal which is placed on a RF carrier.

Viral Orbital Vehicle (V-ROVER) Clocking & Synchronization

The Viral Orbital Vehicle (V-ROVER) synchronizes its receive and transmit data digital streams to the national viral molecular network reference atomic oscillator. The reference oscillator is tied to the Global Positioning System as its standard. All of the Viral Orbital Vehicle are configured in a recovered clock formation so that the entire access network is synchronized to the Protonic Switching and Nucleus layers of the network. This will ensure that the bit error rate (BER) of the network at the access level will be in the order of 1 part of 1,000,000,000,000.

The access device uses the intermediate frequency (IF) signal in the 64-4096-bit QAM modem to recover the digital clocking signal by using its internal Phase Lock Loop (PLL) to control the local oscillator. The phased locked local oscillator then produces several clocking signals which are distributed to the IWIC chip that drives the cell framing formatting and switching; orbital time-slot assignment; and atto-second multiplexing. Also, the network synchronized derived clock signal times in the end users and access systems digital data stream, VOIP voice packets, IP data packets/MAC frames, native AAPI voice and video signals into the Viral Orbital Vehicle's access ports.

End User Application

The end users connected to the Viral Orbital Vehicle (V-ROVER) will be able to run the following applications:
 INTERNET ACCESS
 VEHICLE ONBOARD DIAGNOSTICS
 VIDEO & MOVIE DOWNLOAD
 NEW MOVIES RELEASE DISTRIBUTION
 ON-NET CELL PHONE CALLS
 LIVE VIDEO/TV DISTRIBUTION
 LIVE VIDEO/TV BROADCAST
 HIGH RESOLUTION GRAPHICS
 MOBILE VIDEO CONFERENCING
 HOST TO HOST
 PRIVATE CORPORATE NETWORK SERVICES
 PERSONAL CLOUD
 PERSONAL SOCIAL MEDIA
 PERSONAL INFO-MAIL
 PERSONAL INFOTAINMENT
 VIRTUAL REALTY DISPLAY INTERFACE AND NETWORK SERVICE
 INTELLIGENT TRANSPORTATION NETWORK SERVICE (ITS)
 AUTONOMOUS VEHICLE NETWORK SERVICES
 LOCATION BASED SERVICES The Viral Orbital Vehicle—V-ROVERs Access Node comprises of a housing that has:

One (1) to eight (8) physical USB; (HDMI) port; an Ethernet port, a RJ45 modular connector; an IEEE 1394 interface (also known as FireWire) and/or a short-range communication ports such as a Bluetooth; Zigbee; near field communication; WiFi and WiGi; and infrared interface.

These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo audio; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

After the aforementioned multiplicity of customers' data digital streams traverse the V-ROVERs access node ports interfaces, they are clocked into its Instinctively Wise Integrated Circuit (IWIC) gates by the internal oscillator digital pluses that are synchronized to the phase lock loop (PLL) recovered clock signals which are distributed throughout the device circuitry to time and synchronize all digital data signals. The customer digital streams are then encapsulated into the viral molecular network's formatted 70-byte cell frames. These cell frames are equipped with cell sequencing numbers, source and destination addresses, and switching management control headers consisting of 10 bytes with a cell payload of 60 bytes.

The V-ROVER CPU Cloud Storage & Display Capabilities

The V-ROVER is equipped with a multi-core central processing unit (CPU) for managing the Attobahn distributed viral cloud technology; unit display and touch screen functions; network management (SNMP); and system performance monitoring.

Instinctively Wise Integrated Circuit (IWIC)—V-ROVER

The V-ROVERs access node device housing embodiment includes the function of placing the 70-byte cell frames into the Viral molecular network into the IWIC. The IWIC is the cell switching fabric of the Viral Orbital Vehicle (V-ROVERs, Nano-ROVERS, and Atto-ROVERs). This chip operates in the terahertz frequency rates and it takes the cell frames that encapsulates the customer's digital stream information and place them onto the high-speed switching buss. The V-ROVERs access node has four parallel high-speed switching busses. Each buss runs at 2 terabits per second (TBps) and the four parallel busses move the customer digital stream encapsulated in the cell frames at combined digital speed of 8 Terabits per second (TBps). The cell switch provides 8 TBps switching throughput between its customers connected ports and the data streams that transit the Viral Orbital Vehicle.

TDMA Atto Second Multiplexing (ASM)—V-ROVER

The V-ROVERs housing has an Atto Second Multiplexing (ASM) circuitry that uses the IWIC chip to place the switched cell frames into orbital time slots (OTS) across four (4) digital stream running at 40 Gigabits per second (GBps) each, providing an aggregate data rate of 160 GBps. The ASM takes cell frames from the high-speed busses of the cell switch and places them into orbital time slots of 0.25 micro second period, accommodating 10,000 bits per orbital time slot (OTS). Ten of these orbital time slots makes one of the Atto Second Multiplexing (ASM) frames, therefore each ASM frame has 100,000 bits every 2.5 micro second. There are 400,000 ASM frames every second in each 40 GBps digital stream. Each of the four 400,000 ASM frames digital stream are placed into Time Division Multiple Access (TDMA) orbital time slots. The TDMA ASM moves 160 GBps via 4 digital streams to the intermediate frequency (IF) 64-4096-bit QAM modems of the radio frequency section of the V-ROVER.

In this embodiment, the Viral Orbital Vehicle has a radio frequency (RF) section that consist of a quad intermediate frequency (IF) modem and RF transmitter/receiver with four (4) RF signals. The IF modem is a 64-4096-bit QAM that takes the four individual 40 GBps digital streams from the TDMA ASM and modulate them into an IF gigahertz frequency which is then mixed with one of the four (4) RF carriers. The RF carriers is in the 30 to 3300 Gigahertz (GHz) range.

The Viral Orbital Vehicle (V-ROVER) housing has an oscillator circuitry that generates the digital clocking signals for all of the circuitry that needs digital clocking signals to time their operation. These circuitries are the port interface drivers, high-speed busses, ASM, IF modem and RF equipment. The oscillator is synchronized to the Global Positioning System (GPS) by recovering the clocking signal from the received digital streams of the Protonic Switches which are reference to Attobahn central clocks atomic oscillators that will be located in North America (NA—USA), Asia Pacific (ASPAC—Australia), Europe Middle East & Africa (EMEA—London), and Caribbean Central & South America (CCSA—Brazil).

3). Each of Attobahn's atomic clock has a stability of 1 part in 100 trillion bits. These atomic clocks are reference to the GPS to ensure global clock synchronization and stability of Attobahn network worldwide. The viral orbital vehicle's oscillator has a phase lock loop circuitry that uses the recovered clock signal from the received digital stream and control the stability of the oscillator output digital signal.

V-ROVER Access Network Layer Traffic Management

At the ANL level the viral orbital vehicles (V-ROVERs) determine which traffic is transiting its node and switch it to one of its four neighboring viral orbital vehicles (V-ROVER, Nano-ROVER, and Atto-ROVER) depending on the cell frame destination node. At the ANL level, all of the traffic traversing between the viral orbital vehicles (V-ROVER) are being terminated on one of the viral orbital vehicles (V-ROVER) in that atomic domain. The Protonic Switch that acts as a gate keeper for the atomic domain that it presides over. Therefore, once traffic is moving within the ANL, it is either on its way from its source Viral Orbital Vehicle (V-ROVER) to its presiding Protonic Switch, that had already adopted it as its primary adopter; or it is being transit toward its destination viral orbital vehicle (V-ROVER, Nano-ROVER, and Atto-ROVER). Hence, all of the traffic in an atomic domain is for that domain in the form of leaving its viral orbital vehicle on its way to the Protonic Switch to go toward the Nucleus Switch and then sent to the Internet, a corporate host, native video or on-net voice/calls, movie download, etc. or being transit to be terminated on one of the viral orbital vehicles in the domain. This traffic management makes sure that traffic for other atomic domains are not using bandwidth and switching resources in another domain, thus achieving bandwidth efficiency within the ANL.

DETAILED DESCRIPTION OF THE DISCLOSURE

The present disclosure is directed to Attobahn Viral Molecular Network that is a high speed, high capacity terabits per second (TBps) millimeter wave 30-3300 GHz wireless network, that has an adoptive mobile backbone and access levels. The network comprises of a three-tier infrastructure using three types of communications devices, a United States country wide network and an international network utilizing the three communications devices in a molecular system connectivity architecture to transport voice, data, video, studio quality and 4K/5K/8K ultra high definition Television (TV) and multimedia information.

The network is designed around a molecular architecture that uses the Protonic Switches as nodal systems acting as protonic bodies that attracts a minimum of 400 Viral Orbital Vehicle (V-ROVER, Nano-ROVER, and Atto-ROVER) access nodes (inside vehicles, on persons, homes, corporate offices, etc.) to each one of them and then concentrate their high capacity traffic to the third of the three communications devices, the Nucleus Switch which acts as communications hubs in a city. The Nucleus Switches communications devices are connected to each other in a intra and intercity core telecommunication backbone fashion. The underlying network protocol to transport information between the three communications devices (Viral Orbital Vehicle access device [V-ROVER, Nano-ROVER, and Atto-ROVER], Protonic Switch, and Nucleus Switch) is a cell framing protocol that these devices switch voice, data, and video packetized traffic at ultra-high-speeds in the atto-second time frame. The key to the fast cell-based and atto-second switching and Orbital Time Slots multiplexing respectively is a specially designed integrated circuit chip called the IWIC (Instinctive Wise Integrated Circuit) that is the primary electronic circuitry in these three devices.

Viral Molecular Network Architecture

Figure 1:
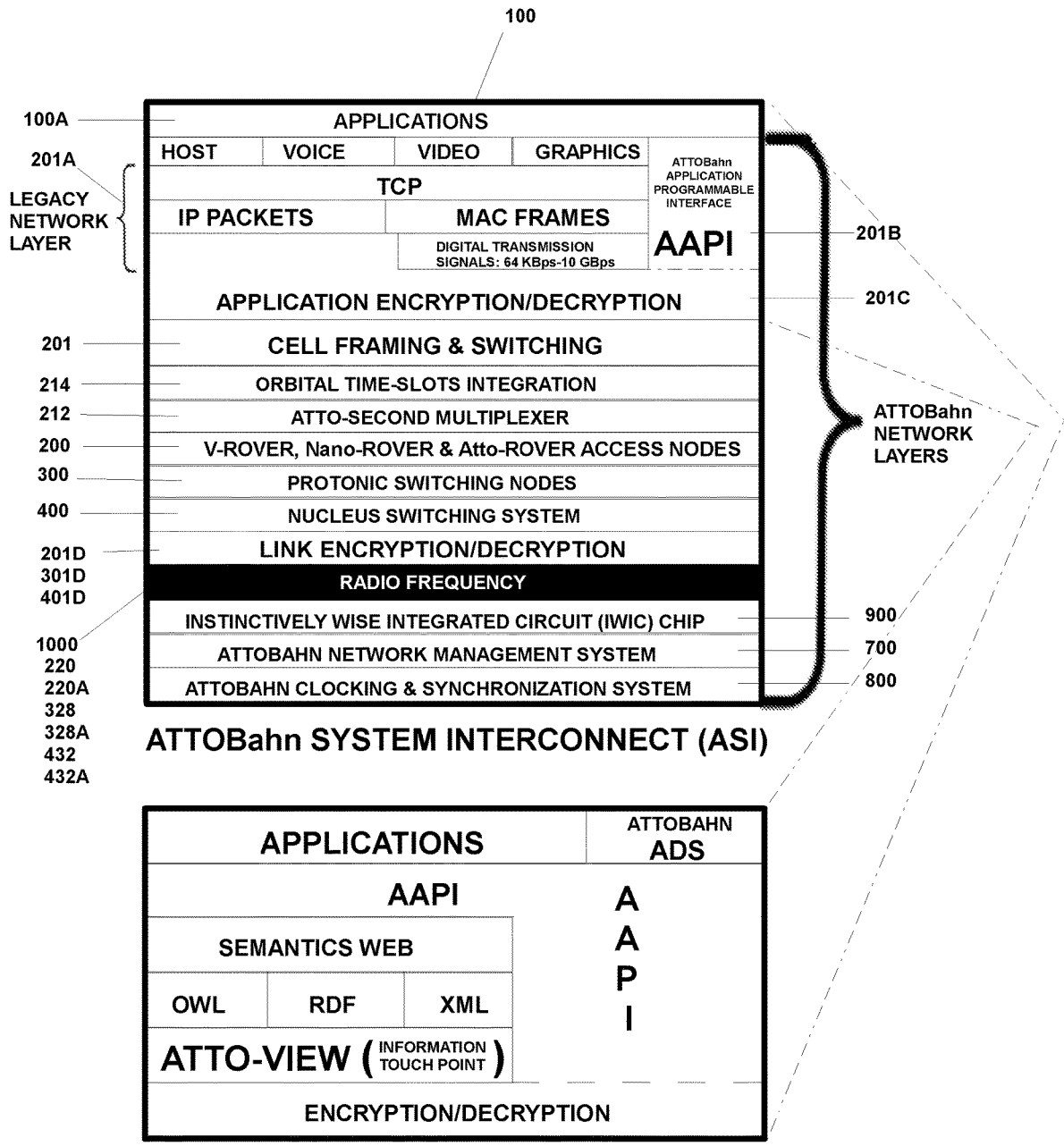
FIG. 1.0 is a block diagram of viral molecular network architecture that displays the hierarchical layout of this high-speed, high-capacity terabits per second (TBps), millimeter wave wireless network that has an adoptive mobile backbone and access levels, shown in an embodiment of the invention.

As an embodiment of this invention FIG. 1.0 shows the viral molecular network architecture 100 from the application to the millimeter wave radio frequency transmission layers. The architecture is designed with three interfaces to the end users' application.

Legacy applications 201A that uses TCP/IP and MAC data link protocols which are then encapsulated into the viral molecular network cell frames by its cell framing and switching system 201. The architecture also accommodates a second type of application called digital streaming bits (64 Kbps to 10 GBps) 201B with or without any known protocol and chop them up into the viral molecular network cell frame format by its cell framing and switching system 201. This type of application could be a high-speed digital signal from a transmission equipment such as a digital TDM multiplexer or some remote robotic machinery with a specialized protocol or the transmission signal for a wide area network that uses the viral molecular network as a pure transmission connection between two fixed points. The third interface to the end user application is what is called Native applications, whereby the end users' application uses Attobahn Application Programmable Interface (AAPI) 201B which is socket directly into the viral molecular network cell frame formation by its cell framing and switching system 201. These three types of application can only enter the viral molecular network through Viral Orbital Vehicles (V-ROVER, Nano-ROVER, and Atto-ROVER) 200 ports.

The next level of the viral molecular network architecture is the Protonic Switch 300 which connects to 400 Viral Orbital Vehicles in an atomic molecular domain design, whereby each Viral Orbital Vehicle is adopted by a parent Protonic Switch once that Viral Orbital Vehicle (V-ROVER, Nano-ROVER, and Atto-ROVER) is turned on and enters the Viral Molecular network theater. The Protonic Switches are connected to Nucleus Switches 400 which act as the hubs for the network in a city, between cities and countries. The Viral Orbital Vehicle (V-ROVER, Nano-ROVER, and Atto-ROVER), Protonic Switch, and Nucleus Switch are connected by wireless millimeter wave radio frequency (RF) transmission system 220A, 328A, and 432A.

Figure 2:
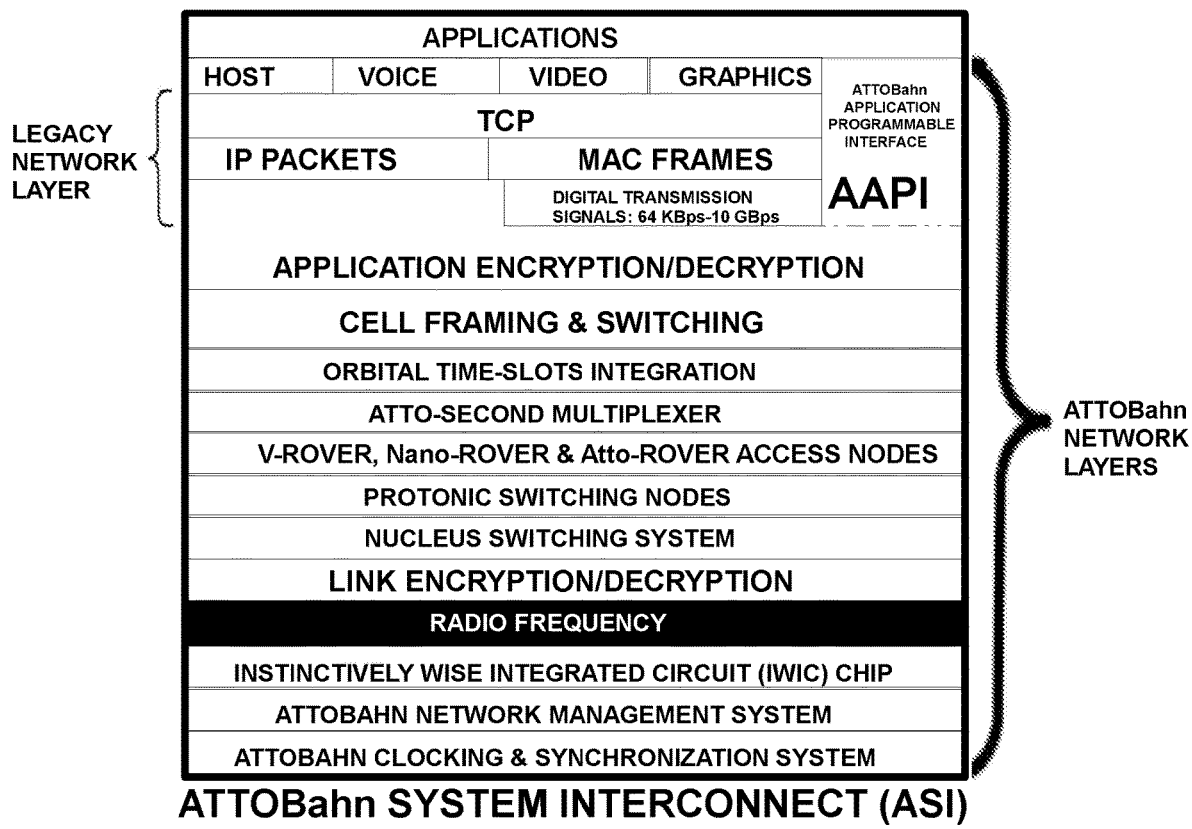
FIG. 2.0 is a block diagram of that shows the standard Internet Transmission Control (TCP)/Internet Protocol (IP) suite compared to Attobahn's architecture.
Figure 2:
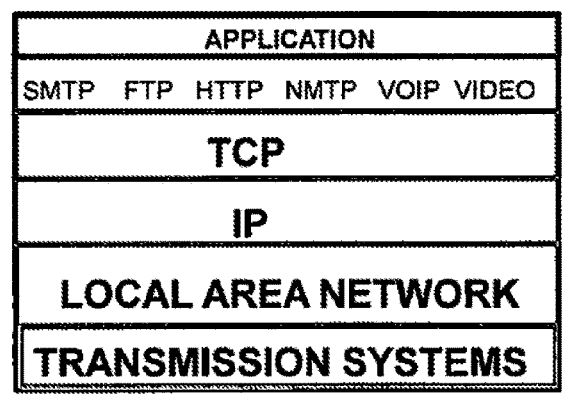

As an embodiment of this invention FIG. 2.0 shows the comparison between the standard TCP/IP protocol suite that is currently used in the Internet compared to the Viral Molecular network communications suite 100. As shown, the suite is different from the Internet TCP/IP suite in the following manner: NOTE—The Attobahn viral molecular network does not use TCP, IP, or MAC protocols.

The Attobahn viral molecular network uses the AAPI 201B to interface native applications information.

The Attobahn viral molecular network uses a proprietary cell framing format and switching 201.

The Attobahn viral molecular network utilizes Orbital Time Slots (OTS) 214 and ultra-high-speed Atto Second Multiplexing 212 technique to multiplex the cell frames into a very high-speed aggregated digital stream for transmission over the RF transmission system 220A, 328A, and 432A.

The Attobahn viral molecular network uses a Viral Orbital Vehicle 200 which houses its AAPI 201B; cell framing and switching functionality 201; Orbital Time Slots (OTS) 214, ASM 212, and RF transmission system 220A, 328A, and 432A as its access node to interface customers' devices (Touch Points 220A) and systems; In contrast the Internet uses Local Area Network switches based on MAC frames layer encapsulation of the customer data.

The Attobahn viral molecular network does cell switching and the Internet does IP routing.

The Internet uses IP routers as the connectivity nodal device and in contrast the Attobahn viral molecular network uses a Protonic Switch 300 using cell framing and switching and atomic molecular domain adoption of all Viral Orbital Vehicles in its operational domain.

The Attobahn viral molecular network uses a Nucleus Switch 400 using a cell framing and switching methodology. In contrast, the Internet uses core backbone routers.

Attobahn Network Hierarchy

Figure 3:
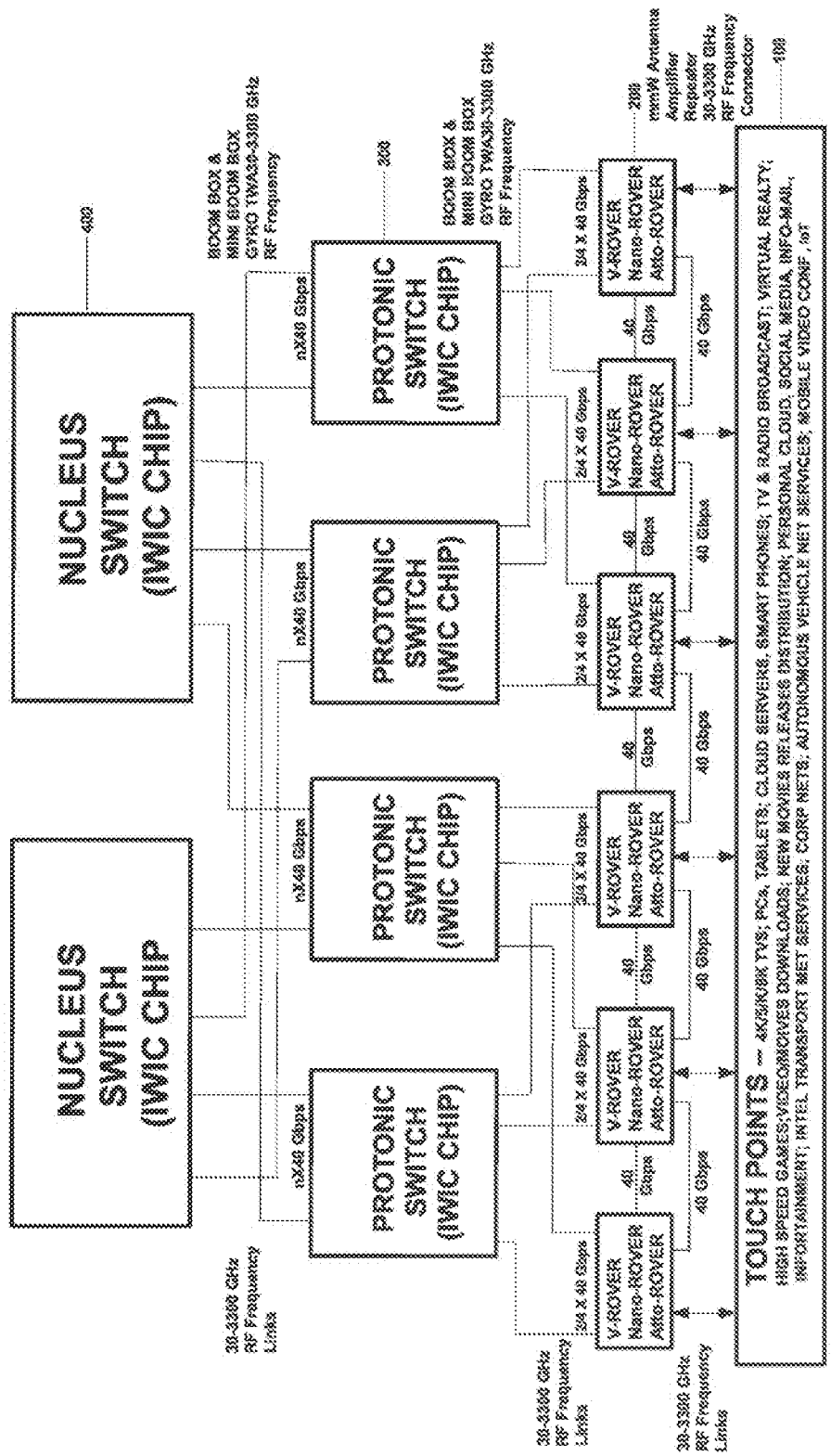
FIG. 3.0 is an illustration of the hierarchical layers of Attobahn network that shows the ultra-high speed switching layer of the Nucleus switches, that is supported by the Protonic switches intermediate switching layer; and the V-ROVERs, Nano-ROVERs, and Atto-ROVERs access switching layer that are connected to the end-user Touch Points. This network hierarchy of switches is an embodiment of the invention.

As an embodiment of this invention FIG. 3.0 shows Attobahn Network Hierarchy that consists of its tertiary level which is an embodiment of this invention, makes up the core backbone network high speed, high capacity tera bits per second cell frame systems called the Nucleus Switch 400. These switches are designed with an Atto Second Multiplexing (ASM) circuitry that uses the IWIC chip to place the switched cell frames into orbital time slots (OTS) across sixteen digital streams running at 40 Gigabits per second (GBps) each, providing an aggregate data rate of 640 GBps. The Nucleus Switch is connected to ISPs, common carriers, cable companies, content providers, WEB servers, Cloud servers, corporate and private network infrastructures via high capacity fiber optics systems or Attobahn Backbone Point-to-Point Boom Box Gyro TWA millimeter wave RF transmission links. The traffic that the Nucleus Switch receives from these external providers are sent to and from the Protonic Switches via Attobahn the Boom Box and Mini Boom Box Gyro TWAs millimeter wave 30-3300 GHz RF signals.

The secondary level of the network as an embodiment of this invention consists of the Protonic Switches 300 that that congregate the virally acquired viral orbital vehicle high-speed cell frames and expeditiously switch them to destination port on a viral orbital vehicle or the Internet via the Nucleus Switch. This switching layer is dedicated to only switching the cell frames between viral orbital vehicles and Nucleus Switches. The switching fabric of the PSL is the work-horse of the viral molecular network.

The primary level of the network hierarchy as an embodiment of this invention is the viral orbital vehicle (V-ROVER, Nano-ROVER, and Atto-ROVER) 200 that is the touch point of the network for the customer. The V-ROVERs, Nano-ROVERS, and Atto-ROVERs collect the customer information streams in the form of voice; data; and video directly from WiFi and WiGi and WiGi digital streams. It is at this digital level where the Touch Points devices' applications 100 access the Attobahn API (AAPI) and subsequently the cell frames circuitry of the viral orbital vehicle.

The RF transmission section of the network hierarchy which is an embodiment of this invention consists of the ultra-high power Boom Box Gyro TWA millimeter wave amplifiers 432A that acts as a powerful terrestrial satellite that receives the RF millimeter waves signals from the Mini Boom Box Gyro TWA millimeter wave amplifiers 328A, the viral orbital vehicle (V-ROVER, Nano-ROVER, and Atto-ROVER} millimeter wave transmitter RF amplifier 220A, and Touch Point devices 101 that are equipped with the IWIC chip 900.

Attobahn Network Services Connectivity

Figure 4:
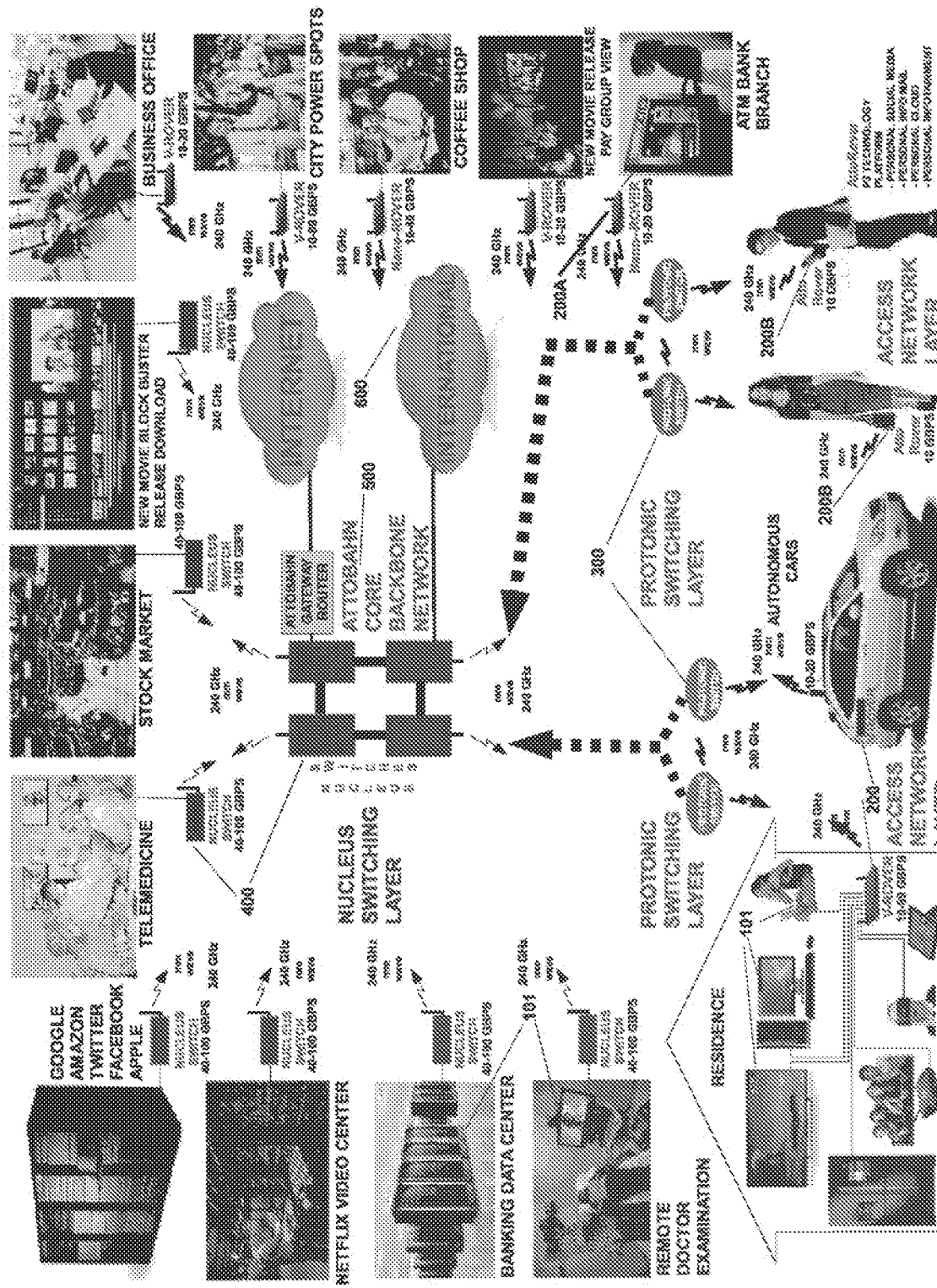
FIG. 4.0 shows the inter-connectivity to the variety of systems and communications services that Attobahn network connects to and manages, which is an embodiment of the invention.

FIG. 4.0 shows the functional capabilities of Attobahn Viral Molecular Network which is an embodiment of this invention, that includes 10 GBps to 80 GBps end user access from the V-ROVER 200; 10 GBps to 40 GBps end user access from the Nano-ROVER 200A; and 10 GBps to 20 GBps from the Atto-ROVER 200B which is an embodiment of this invention.

The V-ROVER is shown in a home providing connections for laptops 101, tablets 101, desktop PC 101, virtual reality 101, video games 101, Internet of Things (IoT) 101, 4K/5K/8K TVs 101, etc. The V-ROVERs and Nano ROVERs are used as the access devices for banking ATMs 101; city power spots 101; small and medium size business offices 101; and access to new movies release 100 from the convenience of home.

The Nucleus Switch 400 as an embodiment of this invention provides the access points for telemedicine facilities 100; corporate data centers 100; content providers such as Google 100, Facebook 100, Netflix 100, etc.; financial stock markets 100; and multiplicity of consumers' and business applications 100.

The Atto-ROVER is an APP convergence computing system which is an embodiment of this invention, provides voice calls 100; video calls 100; video conferencing 100; movies downloads 100; multi-media applications 100; virtual reality visor interface 101; private cloud 100; private info-mail 100 (video mail, FTP large file mail; movies attachment mail, multi-media mail; live interactive video messaging, etc.); personal social media 100; and personal infotainment 100.

The aforementioned applications 100 and Touch Points devices 101 are integrated through the network's AAPI 201B, cell frames 201, ASM 212, of the V-ROVERs, Nano-ROVERs, and Atto-ROVERs and transmitted to the Protonic Switches 300 and Nucleus Switches 400 via millimeter wave RF signals 220.

The Nucleus Switches form the core backbone 500 in North America and the gateway nodes for the Global network (international) 600 which is an embodiment of this invention.

APPI (Attobahn Application Programmable Interface)

Figure 5:
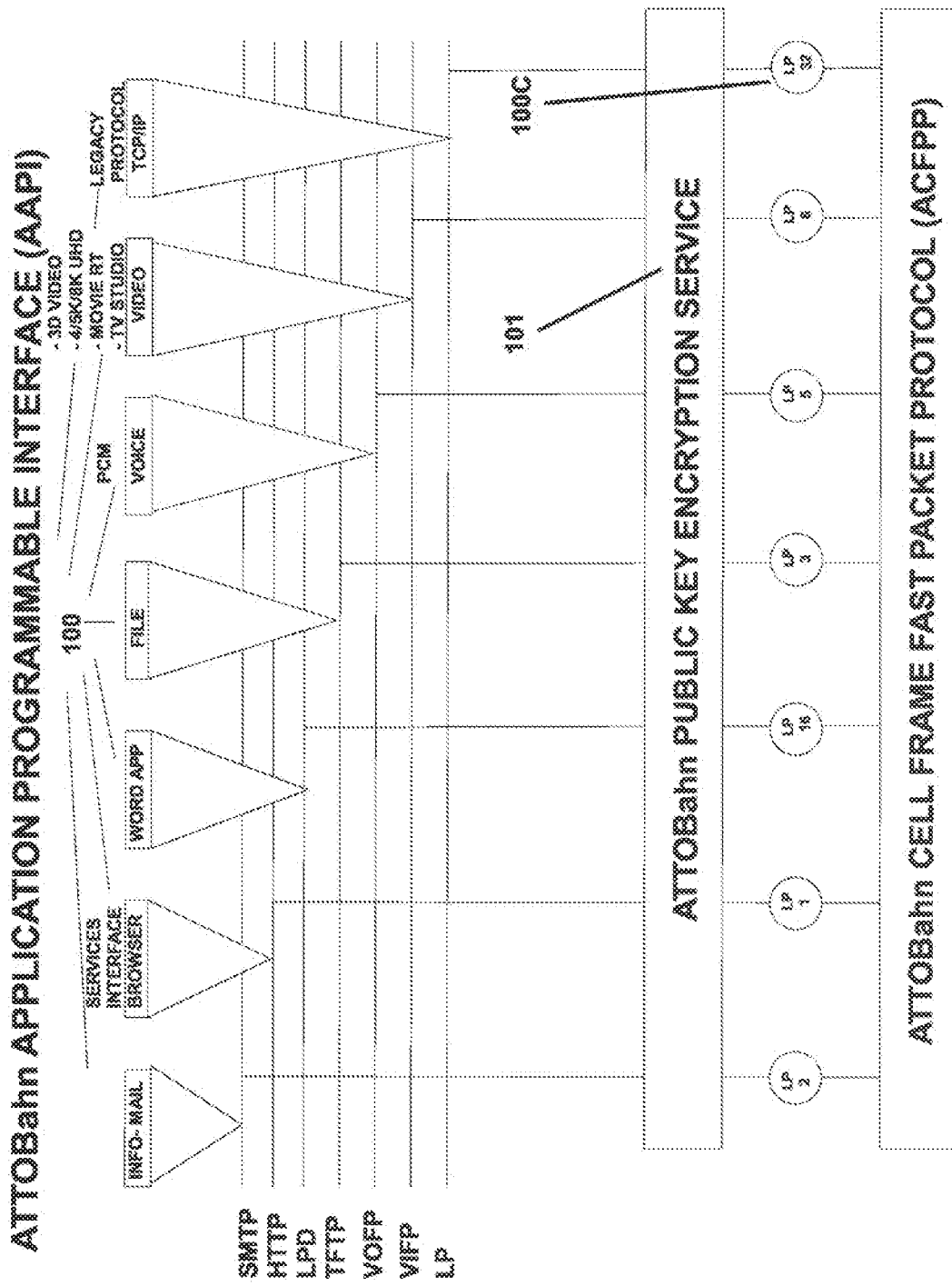
FIG. 5.0 is an illustration of Attobahn Application Programmable Interface (AAPI) that interfaces to the end users' applications, the network encryption services, and the logical network ports which is an embodiment of this invention.

FIG. 5.0 shows Attobahn AAPI 201B interface which is an embodiment of this invention, to the end users' applications 100, logical port assignment 100C, encryption 201C, and cell frame switching functions which is an embodiment of this invention. The operations of the AAPI is series of proprietary subroutines and definitions that allows various applications for the Web, Semantics Web, IoT, and non-standard, private applications to interface to the Attobahn network. The AAPI has a library data set for developers to use to tie their proprietary applications (APPS) into the network infrastructure.

The AAPI software resides as an APP in the customers touch point devices or in the V-ROVER, Nano-ROVER, and Atto-ROVER devices which is an embodiment of this invention. In the case of touch point AAPI APP, the software is loaded onto the customers' laptops, tablets, desktop PC, WEB servers, cloud servers, video servers, smart phones, electronic gaming system, virtual reality devices, 4K/5K/8K TVs, Internet of Things (IoT), ATMs, Autonomous Vehicles, Infotainment systems, Autonomous Auto Network, various APPs, etc.; but is not limited to the aforementioned applications.

When the AAPI 201B is on the V-ROVER 200 Nano-ROVER 200, and the Atto-ROVER 200, the customers' application 100 data is transformed to AAPI format, encrypted and send to the cell frame switching system and placed into the Attobahn Cell Frame Fast Packet Protocol (ACFPP) for transport across the network.

Figure 6:
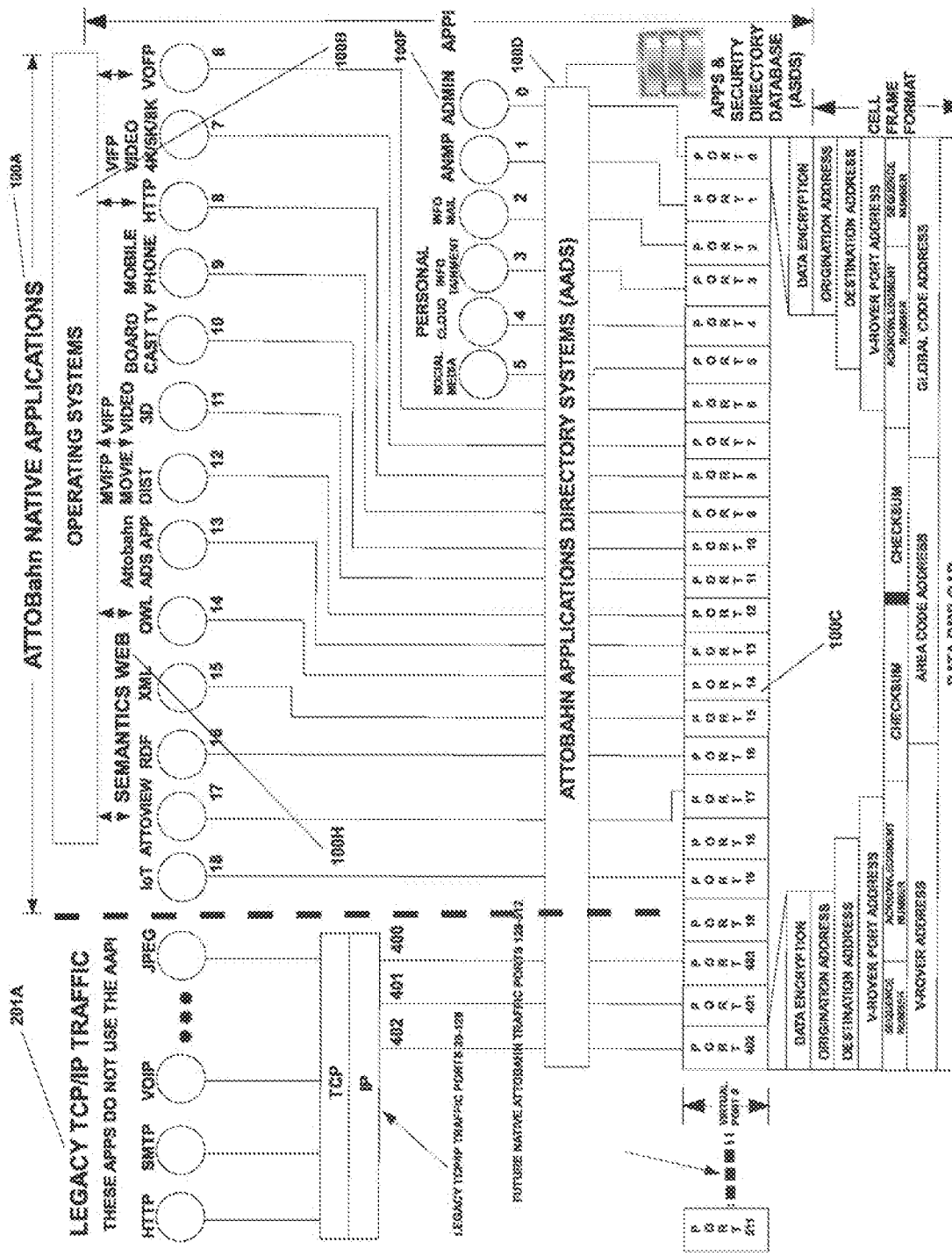
FIG. 6.0 is an illustration of the Attobahn native applications and associated layers that confirms to Attobahn API (AAPI) and high speed 10 and above giga bits per second which is an embodiment of this invention.

FIG. 6.0 provide a more detailed display of the APPI 201C, logical ports, data encryption/decryption 201B, Attobahn Cell Frame Fast Packet Protocol (ACFPP) 201, the various (typical) applications 100 that can traverse the Attobahn viral molecular network which is an embodiment of this invention.

The AAPI interfaces two groups of APPs:
Native Attobahn APPs 100A
Legacy TCP/IP APPs 201A
NATIVE ATTOBAHN APPS The Native Attobahn APPs are APPs that uses the APPI to gain access to the network. These APPs are as follows but not limited to this list.

Logical Application Type
Port
0 Attobahn Administration Data that is always in the first cell frame between any two ROVERs devices that help set up the connection-oriented protocol between application. This application also controls the management messages for paid services such as Group Pay Per View for New Movies Release; purchased videos; automatic removal of videos after being viewed by users; etc.

1 Attobahn Network Management Protocol. This port is dedicated to transport all of Attobahn's network management information from V-ROVERs, Nano-ROVERs, Atto-ROVERs, Protonic Switches, Gyro TWA Boom Boxes Ultra-High Power Amplifiers, Gyro TWA Mini Boom Box High Power Amplifiers, Fiber Optics Terminals, Window-Mounted mmW RF Antenna Amplifier Repeaters, and Door/Wall mmW RF Antenna Amplifier Repeaters.

2 Personal Info-Mail
3 Personal Infotainment
4 Personal Cloud
5 Personal Social Media
6 Voice Over Fast Packet (VOFP)
7 4K/5K/8K Video Fast Packet (VIFP)
8 Musical Instrument Digital Interface (MIDI)
9 Mobile Phone
10 Moving Picture Expert Group (MPEG)
11 3D Video-Video Fast Packet (3DVIFP)
12 Movie Distribution (New Movie Releases and 4K/5K/8K Movie Download—Video Fast Packet (MVIFP)
13 Broadcast TV Digital Signal (TVSTD)
14 Semantics WEB—OWL (Web Ontology Language)
15 Semantics WEB—XML (Extensible Markup Language)
16 Semantics WEB—RDF (Resource Descriptive Framework)
17 ATTO-View (Attobahn's user interface to the network services)
18 Internet of Things APPS
19-399 New Applications such as Native Attobahn Applications data.

Attobahn native APPS 100A are applications 100 that are written to interface its APPI routines and proprietary cell frame protocol. These native APPs use the AAPI and cell frames as their communications stack to gain access to the network. The AAPI provides a proprietary application protocol that handles host-to-host communications; host naming; authentication; and data encryption and decryption using private keys. The AAPI application protocol directly sockets into the cell frames without any intermediate session and transport protocols.

The APPI manages the network request-response transactions for the sessions between client/server applications and assigns the logical ports of the associated V-ROVERs, Nano-ROVERs, and Atto-ROVERs cell frame addresses where the sessions are established. Attobahn APPI can accommodate all of the popular operating systems 100B but not limited to this list:
Windows OS
Mac OS
Linux (various)
Unix (various)
Android
Apple IOS
IBM OS
Legacy Applications The Legacy Applications 201A are applications that use the TCP/IP protocol. The AAPI is not involved when this application interfaces Attobahn network. This protocol is sent directly to the cell frame switch via the encryption system.

The logical ports assigned for Legacy Applications are:
Logical Application Type
Port
400 to 512 Legacy Applications The Legacy Applications access the network via Attobahn WiFi connection which is connected to the encryption circuitry and then into the cell frame switching fabric. The cell framing switch does not read the TCP/IP packets but instead chop the TCP/IP packets data stream into discrete 70-bytes data cell frames and transport them across the network to the closest IP Nodal location. The V-ROVERs, Nano-ROVERs, and Atto-ROVERs are designed to take all TCP/IP traffic from the WiFi and WiGi data streams and automatically place these IP packets into cell frames, without affecting the data packets from their original state. The cell frames are switched and transported across Attobahn network at a very high data rate.

Each IP packet stream is automatically assigned the physical port at the nearest Nucleus Switch that is collocated with an ISP, cable company, content provider, local exchange carrier (LEC) or an interexchange carrier (IXC). The Nucleus Switch hands off the IP traffic to the Attobahn Gateway Router (AGR). The AGR reads the IP address, stores a copy of the address in its AGR IP-to-Cell Frame Address system, and then hands off the IP packets to the designated ISP, cable company, content provider, LEC, or IXC network interface (collectively "the Providers"). The AGR IP-to-Cell Frame Address system (IPCFA) keeps track of all IP originating addresses (from the originating TCP/IP devices connected to the ROVERs) that were hand off to the Providers and their correlating ROVERs port addresses (WiFi and WiGi).

As the Providers hands off the returned IP packets back to the AGR, that are communicating with the end user TCP/IP devices connected to the ROVERs, the AGR looks up the originating IP addresses and correlates them to the ROVERs' port and assign that IP data stream to the correct ROVER cell frame port address. This arrangement allows the TCP/IP applications to traverse the network at extremely high data rates which takes the WiFi average channel 6.0 MBps data stream up to 10 GBps which is more than 1,000 faster. The design of accommodating older data applications like TCP/IP over Attobahn greatly reduces the latency between the client APP and the web servers. In addition to the reduced latency benefit, the Attobahn network secures the data via its separate Application Encryption and RF Link Encryption circuitry.

Attoview Services Dashboard

Figure 7:
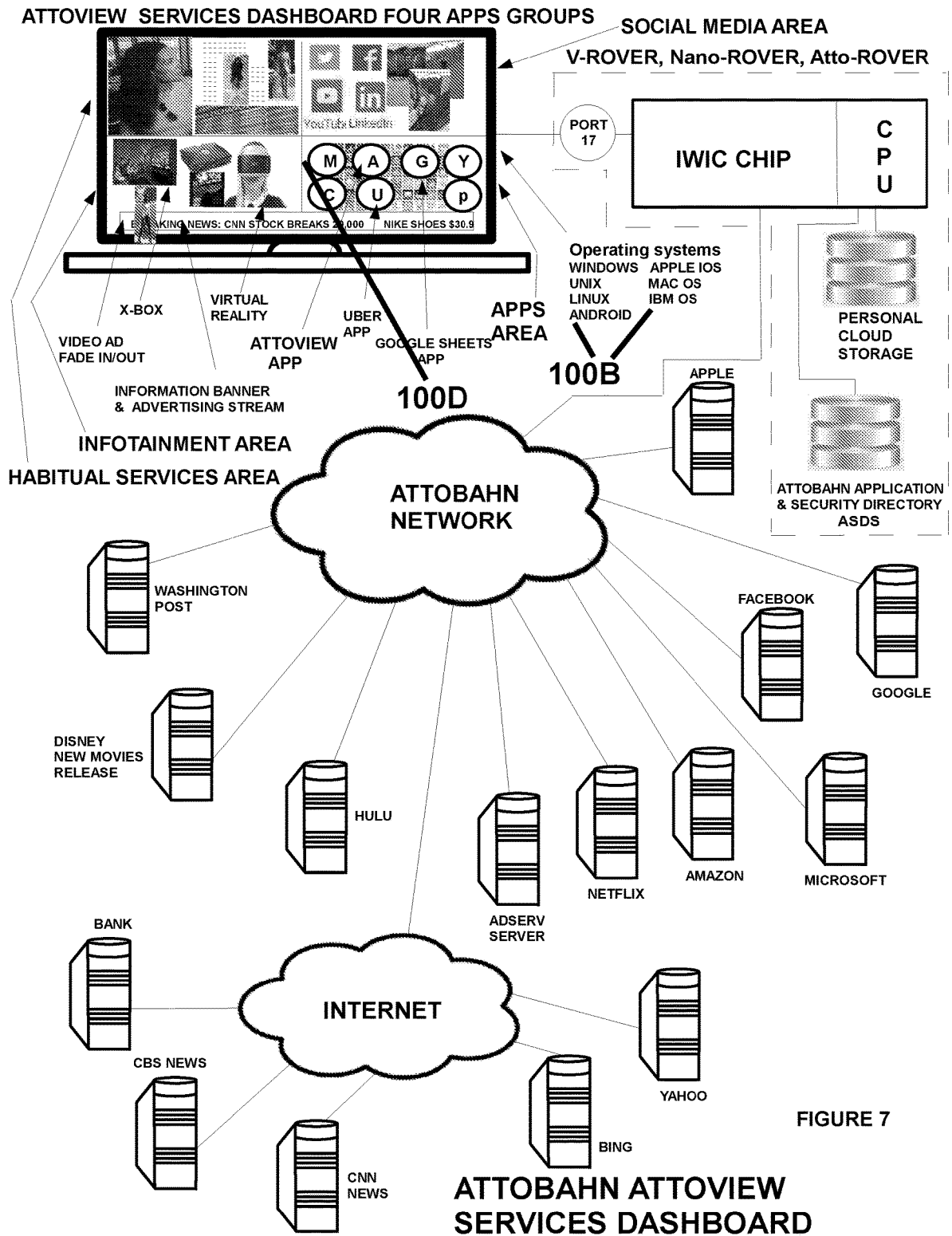
FIG. 7.0 is an illustration of AttoView Services Dashboard which is an embodiment of this invention.

FIG. 7.0 shows the Attobahn AttoView 100A is a multimedia, multi-functional user interface APP (named the AttoView Service Dashboard), that is more than a simple browser which is an embodiment of this invention. The AttoView Services Dashboard 100B utilizes OWL/XML Semantics Web functionality as illustrated in FIG. 6.0. AttoView is the end user's virtual Touch Point to access the network services. The Attobahn network services range from the high-speed bandwidth services to using the P2 Technologies (Personal & Private) such as Personal Cloud, Personal Social Media, Personal InfoMail, and Personal Infotainment. AttoView also provides access to all free and payment services as listed below:

INTERNET ACCESS
VEHICLE ONBOARD DIAGNOSTICS
VIDEO & MOVIE DOWNLOAD
NEW MOVIES RELEASE DISTRIBUTION
ON-NET CELL PHONE CALLS
LIVE VIDEO/TV DISTRIBUTION
LIVE VIDEO/TV BROADCAST
HIGH RESOLUTION GRAPHICS
MOBILE VIDEO CONFERENCING
HOST TO HOST
PRIVATE CORPORATE NETWORK SERVICES
PERSONAL CLOUD
PERSONAL SOCIAL MEDIA
PERSONAL INFO-MAIL
PERSONAL INFOTAINMENT
ADS MONITORING USAGE DISPLAY
VIRTUAL REALTY DISPLAY INTERFACE AND NETWORK SERVICE
INTELLIGENT TRANSPORTATION NETWORK SERVICE (ITS)
AUTONOMOUS VEHICLE NETWORK SERVICES

The AttoView APP is downloaded on the end users' computing devices which manifests itself as an icon on the device display. The user clicks on the AttoView to access Attobahn network services. The icon opens as a browser frame which allows the user to log into Attobahn network through AttoView.

The AttoView Service Dashboard prompts the user to authenticate themselves for security purposes to gain access to Attobahn network services. Once they are log into the network, they have uninterrupted access to all of Attobahn network services 24 hours/days 7 days per week at no cost (free network service) for the high-speed bandwidth, P2, and Internet access. All existing free services such as Google, Facebook, Twitter, Bing, etc., the user will able to access at their leisure. Subscription services, such as Netflix, Hulu, etc., that the user accesses via Attobahn will depend on their service agreements with those service providers.

Figure 8:
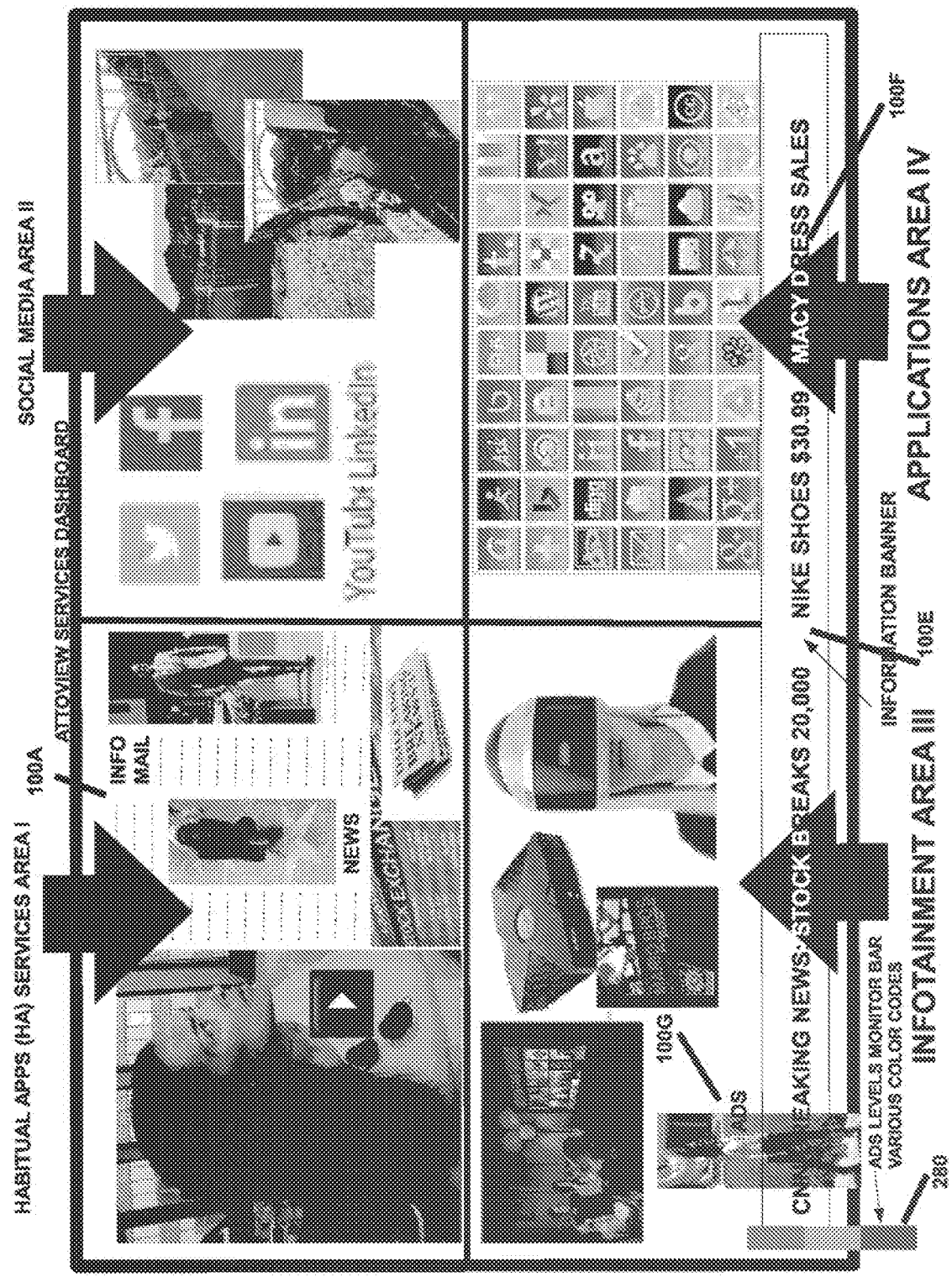
FIG. 8.0 is an illustration of AttoView Services Dashboard that shows the detail layout of the Dashboard four areas of Habitual APPS; Social Media; Infotainment; and Applications which is an embodiment of this invention.

As shown in FIG. 8.0 AttoView allows the user to log into Attobahn and access all services by using voice commands, clicking on the services icons, or typing, which is an embodiment of this invention. AttoView keeps a profile of the user's Habitual APPS (HA) services 100A and activities and automatically present the most recent informational updates on their HA services. When the user opens the Service Dashboard 100B, he or she is presented with HA updated services information. This feature provides the user with the convenience of having all of their services current information available for perusal without having to do anything. This saves time and gives the user what they want without the extra work of opening web browsers, typing URLs, waiting on these web sites and associated services to response.

The AttoView user interface as shown in FIG. 8.0, which is an embodiment of this invention, is called AttoView Service Dashboard because of its multiplicity of services and rich functional capabilities compared to legacy browser such as Chrome, Internet Explorer (IE), Microsoft Edge, Firefox or Safari. AttoView appears on the user's computing device (Desktop PC, laptop, tablet, phone, TV, etc.) screen once that device access the network. AttoView Service Dashboard provides an information banner 100E at the bottom of the user's device display. This banner is used to bring breaking news, emergency alerts, weather information, and streaming advertising information 100F. When the user clicks on the banner, AttoView connects them to that source of information. AttoView allows small superimposed advertising videos 100G to intermittently fade in and out on the lower part of the computing device display for a few seconds. The user has the option to remove the AttoView information banner and the intermittent fade in/out videos from their device display, and accept the nominal Attobahn service charges to access the network bandwidth.

AttoView Service Dashboard utilizes the Semantics Web 100H functionality as shown in FIG. 6.0, whereby it can analyze the user's data received through emails, documents, images, videos, etc. The Service Dashboard uses the data to makes decisions on how to handle the information even before it passed to the user. AttoView can open the email, decide what to do with it, analyze the data content and even set up alerts and responses. Depending on if the data contains some document (example a spread sheet) that the user was waiting on to place it into another document or file, then AttoView will add the data to that document or file without the user invention. AttoView will alert the user that it was done. The user can set certain conditions in advance on how the document should be handle prior to it being receive. AttoView will carry out the instructions based on those preset conditions and response to emails, certain requests, and carry out work based on various criterion before the user gets involved.

AttoView uses the same Semantic Web functionality to dynamically prepare the user information and set up its service (browser) dashboard based on the user's behavioral habits. When the user clicks on Attobahn icon to start their day, or use Attobahn services, all of their customary data and services are presented to them with current updated information.

In today's legacy browser environment, this function is completely independent of the computing systems' other interfaces. Therefore, when using a Microsoft Windows operating system, access to Microsoft applications and other APPs on the system is via several separate interfaces than the browser interface. Hence, the user must hop between interfaces and windows to access various applications.

In contrast AttoView Services Dashboard is one common interface and view to access all APPs on the computing device. The layout of the Services Dashboard which is an embodiment of this invention, consolidates the following functions into one view:

Attobahn Network Services
Google, Facebook, Amazon, Apple, Twitter, Microsoft
Netflix, Hulu, HBO, other OTT Services, CNN, CBS, ABC, other TV News
Financial Services (Banks and stock market)
Social Media Services
Other Internet Services
Infotainment Services
Information Mail
Video Games Network
Virtual Reality Network Services
Windows, IOS, & Android Entertainment APPs The Services Dashboard interface layout is shown in FIG. 8.0 which is an embodiment of this invention. The Dashboard has four APPs group areas and one general services area that displays the information banner 100E and advertising data 100F and 100G.

Interface Area I
AttoView Services Dashboard Interface Area I is an embodiment of this invention, consists of the user's Habitual Behavioral services consists of:
Personal Information Mail
Personal Social Media
Personal Infotainment
Personal Cloud
Google
Twitter
Business Email
Legacy Mail
TV News OTT
Financial Services (banks and stock markets)
Online News Paper (Washington Post, Wall Street, Chicago Tribune, etc.)
Word Processing, Spread Sheet, Presentation, Database, Drawing APPs Interface Area II
AttoView Services Dashboard Interface Area II is an embodiment of this invention, consists of the user's Social Media services consists of:
Facebook
Twitter
LinkedIn
Instagram
Google+

Interface Area III
AttoView Services Dashboard Interface Area III is an embodiment of this invention, consists of the user's Infotainment services consists of:
Netflix
Amazon Prime
Apple Music & Video downloads
Hulu
HBO
Disney
New Movies Releases (Universal, MGM, Disney, Sony, Times Warner, Disney, etc.)
Online Video Rental
Video Games Network
Virtual Reality Network Services
Live Music Concerts Interface Area IV
AttoView Services Dashboard Interface Area IV which is an embodiment of this invention, consists of the user's Habitual Behavioral services consists of:
Adobe
Maps
Weather Channel
APPLE APP Store
Play Store
JW Library
Recorder
Messenger
Phone
Contacts
Parkmobile
Skype
Uber
Yelp
Earth
Google Sheets AttoView Services Dashboard design focuses on services and convenience for the user.

Attoview Advertisement Level Monitoring System

Figure 9:
FIG. 9.0 is an illustration of the Attobahn AttoView ADS Level Monitoring System (AAA) that has a secured APP and method to allow broadband viewers an alternative way to pay for digital content by simultaneously viewing ads with an advertisement overlay services technology that is embedded in Attobahn APPI FIG. 10.0 is an illustration of Attobahn's cell frame address schema that provides 7,200 trillion addresses across the network infrastructure which is an embodiment of this invention.

As illustrated in FIG. 9.0 which is an embodiment of this invention, the Attobahn AttoView ADS Level Monitoring System (AAA) 280F has a secured APP and method to allow broadband viewers an alternative way to pay for digital content by simultaneously viewing ads with an advertisement overlay services technology 281F that is embedded in the APPI. The APPI has an ADS VIEW APP that runs over Logical Port 13 Attobahn Ads APP address EXT=0.00D Unique address.EXT=32F310E2A608FF.00D and allows ads to superimposes themselves 281F over the videos that are in following Logical Ports:

1. Logical Port 7 4K/5K/8K VIFP/VIDEO address EXT=0.007
Unique address.EXT=32F310E2A608FF.007
2. Logical Port 10 BROADCAST TV address EXT=0.00A
Unique address.EXT=32F310E2A608FF.00A
3. Logical Port 11 3D VIDEO 3DVIFP address EXT=0.00B
Unique address.EXT=32F310E2A608FF.00B
4. Logical Port 12 MOVIE DISTRIBUTION MVIFP address EXT=0.00C
Unique address.EXT=32F310E2A608FF.00C The AAA APP method and system allows broadband viewers to purchase licensed content by simultaneously viewing advertisement that overlay the video content. Customers who access video content that would normally require a license, subscription or other fees in order to view them. The customer can now view these contents without having to pay the fees. Instead, the content is available to the customer because the system has embedded advertisement overlays with pre-negotiated advertisement arrangement that credit the customer based on viewing periods. The number of ADS the customer views is captured and display by the ADS Level Monitor lights/indicators The AAA APP system is accompanied by an advertisement viewing level meter that provides an empty to full gauge (identified by lights/indicators) that correspond with traditional monthly billing periods. The system also allows the customer to turn off and optionally pay for the service based on the negotiated content arrangement with credit provisions for over viewing of advertisements.

The AAA APP is one of the means by which the Attobahn free infotainment services platform will pay for itself so users can enjoy free infotainment by viewing a certain number of ADS on a monthly basis. In effect Attobahn AAA APP allows Attobahn to pay customers for viewing ADS. The payments from Attobahn is in the form of credit that allows the customers to view paid content for free by using their AAA APP ADS viewing to pay for the content on a monthly or annual basis.

The AAA APP design is accessible from smart phones, tablets, TVs and computers. Attobahn uses video as the new HTML for this technology, a very smart text-overlay that is superimposed over video and is used for service setup, administration, video mail (info-mail), social media voice and video communications including data storage management.

Attobahn Cell Frame Addressing Schema

Figure 10:
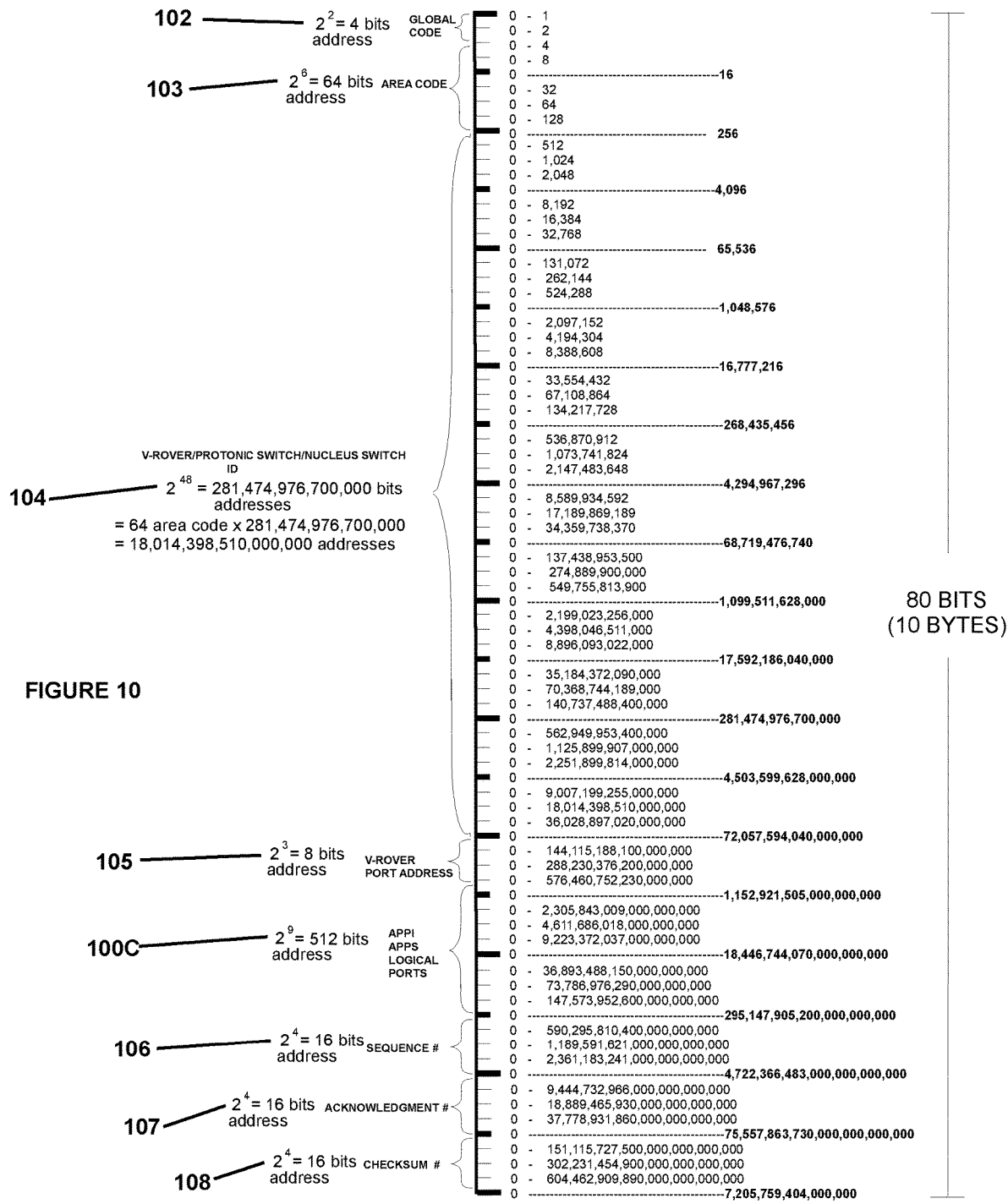

FIG. 10.0 shows Attobahn Cell Frame Address schema which is an embodiment of this invention. The cell frame consists of 70 bytes of which the address header is 10 bytes and the payload consists of 60 bytes.

The cell frame address is broken down into the follow sections that represent various resources in the network:
1. Four World Regions (2 bits) 102
2. 64 Geographic Area Codes (6 bits) 103
3. 281,474,976,700,000 unique identification (ID) addresses 104 for Attobahn devices (48 bits): V-ROVERs, Nano-ROVERs, Atto-ROVERs, Protonic Switches, and Nucleus Switches in each Geographic Area Code. That means each World Region (Global Code) will have 64×281,474,976,700,000=18,014,398, 510,000,000 Attobahn cell frame addresses. Hence, globally a total of 72,057,594,040,000,000 (more than 72,000 trillion) Attobahn cell frame addresses. This address schema will certainly accommodate numerous devices and applications currently on the Internet and the rapidly growing Internet of Things (IoT).
4. The address scheme uses 3 bits for the 8 ports 105 on each V-ROVER, Nano-ROVER, and Atto-ROVER.
5. The address scheme uses 9 bits for the 512 logical ports 100C of the APPI that connects the applications to the cell frames.
6. The cell frame header uses a 4-bit framing sequence number 108 to keep track of the frame sent and acknowledged between the logical ports and their associated applications.
7. The cell frame header uses 4 bits for acknowledgement 107 and retransmission processes for reliable communications between computing devices connected to the network.
8. The cell frame header has a 4-bit checksum 106 for error detection in the cell frames.

The four world regions are equipped with Global Gateway Nucleus Switches that carry the global codes. The global code assignments are:

| CODE | REGION |
|------|--------|
| 00 | North America |
| 01 | EMEA — Europe Middle East & Africa |
| 10 | ASPAC — Asia Pacific |
| 11 | CCSA — Caribbean Central & South America |

Each world region has 64 area codes that comprises of 281 trillion devices addresses has 64 area codes Nucleus Switches connected to it. More than 281 trillion Attobahn device addresses are distributed between each area code. Therefore, each area code has an addressing capacity of over 18,000 trillion addresses, that are assigned to Attobahn devices. Hence, globally Attobahn has a global network addressing capacity of more than 72,000 trillion addresses.

Attobahn Networking Address Operation

Figures 11A, 11B:
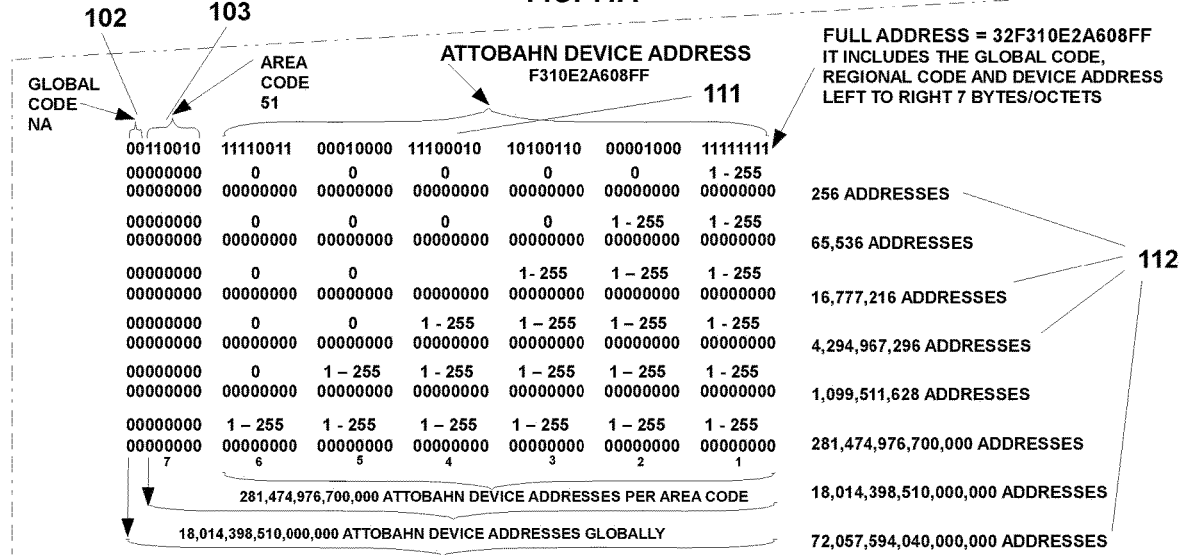
FIGS. 11A and 11B are an illustration of Attobahn Devices Addresses which is an embodiment of this invention.

Each Attobahn device address consists of the Global Code 102, Area Code 103, and device ID address 104, as shown in FIGS. 11A and 11B which is an embodiment of this invention.

The 14-character 32F310E2A608FF address 109 is an example of an Attobahn network address. The 14-character addresses are derived from hexadecimal formatted digits. The hexadecimal bits that consist of 14 nibbles, which are from the 7 bytes of the cell frame address header 102,103, and 104 as illustrated in FIG. 10.0.

The first byte is broken into two sections. The first section consists of two digits (from the left to right) 102 that represent the Global Codes for North America (NA)=00; Europe, Middle East & Africa (EMEA)=01; Asia Pacific (ASPAC)=10; and Caribbean Central & South America (CCSA)=11.

As shown in FIGS. 11A and 11B, each Global Code is accompanied by 64 Area Codes 111 that forms the second section of the first byte of the 7-byte Attobahn address. Each Area Code consists of 6 bits ranging from 000000=Area Code 1 to 111111=Area Code 64 which is an embodiment of this invention. For example, the North America Global Code and its first Area Code will be 00000000; where the first two zeros, 00 from left to right are be NA Global Code and the next six zeros, 000000 from left to right is Area Code 1. Another example, ASPAC Global Code and its Area Code 55 is represented by 10110110; whereby the 10 is the Global Code and 110110 is Area Code 55.

The first byte of the Attobahn address makes up the first two nibbles of the address. The first two nibbles of the model address in FIG. 11A is 32. This nibble comes from Global Code 00 that is NA code and Area Code 110010 that is Area Code 51.

Global Code and Area Code 00 110010

Are combined into the byte:

00110010

These eight digits 00110010 are broken into two nibbles: 0011=3, and

0010=2.

Therefore, 0011 0010=32 are the first two characters or nibbles of the Attobahn address 32F310E2A608FF. The address is broken down into three sections:

Section 1; Global Code NA=00=2 bits that accommodates 4 Global Codes

Section 2; Area Code 51=110010=6 bits that accommodate 64 Area Codes. Sections 1 and 2 are combined to produce the first byte:

00110010.

Section 3: Attobahn device ID/address=6 bytes=48 bits 104 that accommodate 281,474,976,700,000 device ID/address. The 6 bytes of the model address in FIG. 10 are:

11110011 00010000 11100010 10100110 00001000 11111111.

When these bytes are added to the Global Code and Area Code byte, the full Attobahn address is:

00110010 11110011 00010000 11100010 10100110 00001000 11111111

Arranging the 7 bytes into 14 nibbles, 0011 0010 1111 0011 0001 0000 1110 0010 1010 0110 0000 1000 1111 1111

3 2 F 3 1 0 E 2 A 6 0 8 FF

The Attobahn address 32F310E2A608FF is derived in the format above as illustrated in FIG. 11A which is an embodiment of this invention.

In the structure Attobahn address as shown in FIGS. 11A and 11B, each byte or octet 111 from right to left; 2^8 provides 256 address from the utmost right octet. Each subsequent octet from right to left increases the addresses by a multiple of 256. Therefore, the design of the address schema yields the 72,057,594,040,000,000 addresses across the four Global Codes and their 64 Area Codes in the following manner:

Octet 1 Right to Left=256 addresses 112
Octet 1 and 2 Right to Left=65,536 addresses 112
Octet 1, 2, and 3 Right to Left=16,777,216 addresses 112
Octet 1, 2, 3, and 4 Right to Left=4,294,967,296 addresses 112
Octet 1, 2, 3, 4, and 5 Right to Left=1,099,511,628, addresses 112
Octet 1, 2, 3, 4, 5, and 6 Right to Left=281,474,976,700,000 addresses 112
Octet 1, 2, 3, 4, 5, 6, and 7 Right to Left=72,057,594,040,000,000 addresses 112

Attobahn address schema allows a user to have a unique address for all of his/her services. Each user is assigned a 14-character address and all of his/her services such as personal info-mail, personal social media, personal cloud, personal infotainment, network virtual reality, games services, and mobile phone. The user's assigned address is tied to his/her V-ROVER, Nano-ROVER, or Atto-ROVER. The assigned address has an APP extension which is based on the logical port number. For example, the user's info-mail address is based on his/her 14-character address and the info-mail logical port number (extension). This address scheme arrangement simplifies the user communications ID to one address for all services. Today, a user has a separate email address, social media ID, mobile phone number, cloud service ID, FTP service, virtual reality services, etc. Attobahn network services native APPs allows the user to have one address for multiple services.

User Unique Address & Apps Extension

Figure 12:
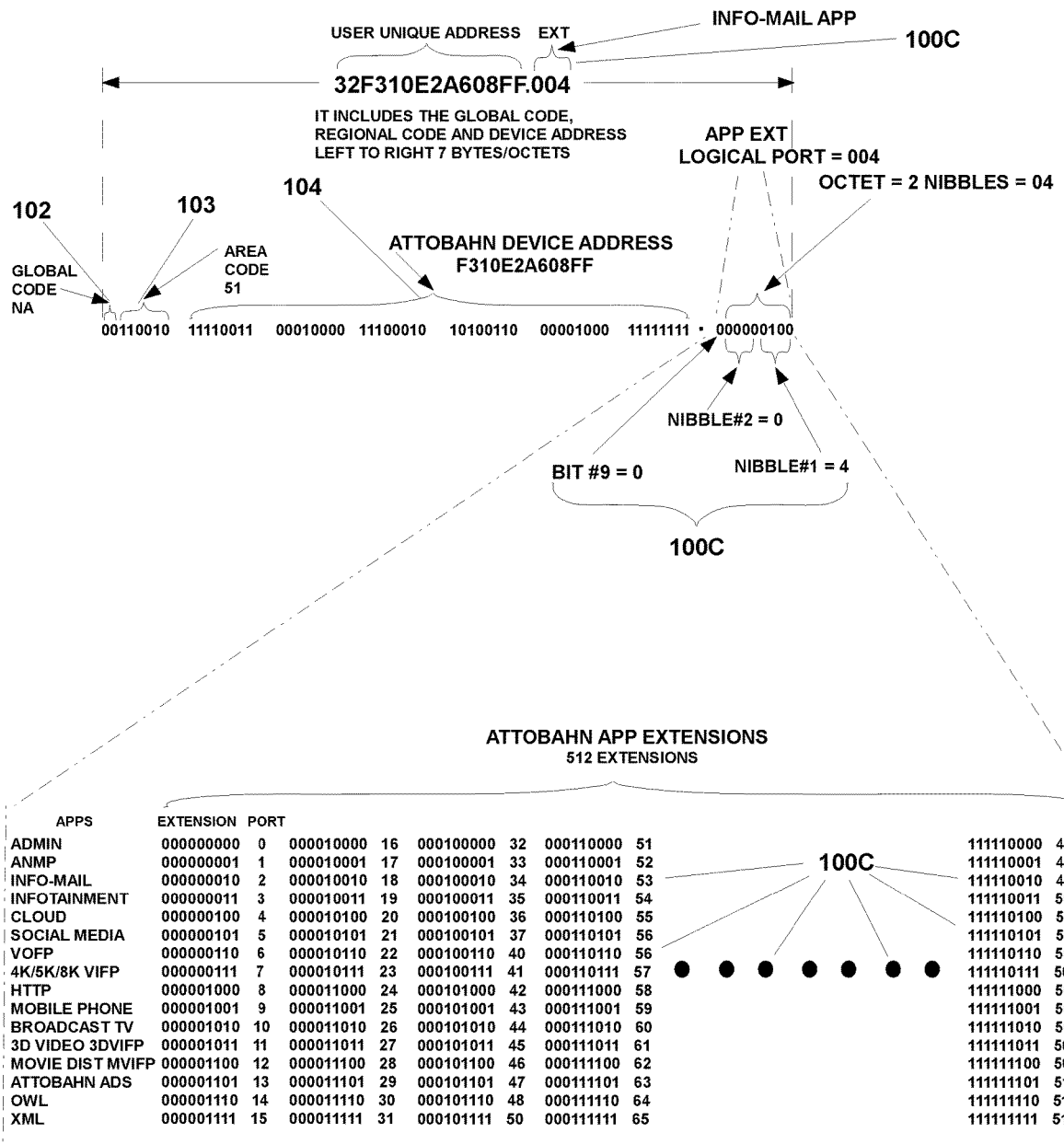
FIG. 12.0 is an illustration of Attobahn User Unique Address & APP Extension which is an embodiment of this invention.

FIG. 12.0 shows the Attobahn user unique address 109 and APPs extension 100C which is an embodiment of this invention, advances the user identification process from a series of applications IDs such as a separate phone number, email address, FTP service, social media, cloud service, etc. The user and the people and systems that he or she wants to communicate with have to remember all of these fragmented services/applications IDs. This is burdensome on all parties involved in the communications process. In contrast, Attobahn eliminates these burdens and provides a single solution communications ID, the actual user and not the services/applications that the user consumes.

Attobahn accomplishes the single user ID communications process by assigning the user a unique Attobahn address that is associated with their Attobahn V-ROVER, Nano-ROVER, and Atto-ROVER. Any Attobahn user that wants to communicate with another Attobahn user via Attobahn's native applications, only need to know the user's Attobahn address. The user initiating the service request does need to know the other user's phone number in order to call him/her. All the calling user does is select the called user unique Attobahn address and click the phone icon. The user does not need to call a phone number. Attobahn network does not use phone numbers, email addresses, social media names, FTP, etc. The service initiating user simply select the user's unique address and click on the icon of the service he/she desires in the AttoView Service Dashboard.

This design changes the way people communicates from the traditional communications services of The user can travel with their V-ROVER, Nano-ROVER, or Atto-ROVER which makes the unique address mobile allowing anyone to communicate with them.

FIG. 12.0 shows the construct of the User Unique Address 109 and its APP extension 100C which is an embodiment of this invention. The first 14 characters 32F310E2A608FF are the user's Attobahn V-ROVER, Nano-ROVER and Atto-ROVER device address. The APP extension=.EXT is represented by the 9 bits. These 9 bits=2^9=512 APP logical ports. The APP EXT is represented by two nibbles from left to right and the ninth bit by itself The user unique Attobahn address and APPs extension 100C will appear as follows:

User unique address: 32F310E2A608FF
1. Logical Port 0 ADMIN address EXT=0.000
Unique address.EXT=32F310E2A608FF.000
2. Logical Port 1 ANMP address EXT=0.001
Unique address.EXT=32F310E2A608FF.001
3. Logical Port 2 Info-Mail address EXT=0.002
Unique address.EXT=32F310E2A608FF.002
4. Logical Port 3 INFOTAINMENT address EXT=0.003
Unique address.EXT=32F310E2A608FF.003
5. Logical Port 4 CLOUD address EXT=0.004
Unique address.EXT=32F310E2A608FF.004
6. Logical Port 5 SOCIAL MEDIA address EXT=0.005
Unique address.EXT=32F310E2A608FF.005
7. Logical Port 6 VOFP address EXT=0.006
Unique address.EXT=32F310E2A608FF.006
8. Logical Port 7 4K/5K/8K VIFP/VIDEO address EXT=0.007
Unique address.EXT=32F310E2A608FF.007
9. Logical Port 8 HTTP address EXT=0.008
Unique address.EXT=32F310E2A608FF.008
10. Logical Port 9 MOBILE PHONE address EXT=0.009
Unique address.EXT=32F310E2A608FF.009
11. Logical Port 10 BROADCAST TV address EXT=0.00A
Unique address.EXT=32F310E2A608FF.00A
12. Logical Port 11 3D VIDEO 3DVIFP address EXT=0.00B
Unique address.EXT=32F310E2A608FF.00B
13. Logical Port 12 MOVIE DISTRIBUTION MVIFP address EXT=0.00C
Unique address.EXT=32F310E2A608FF.00C
14. Logical Port 13 Attobahn Ads APP address EXT=0.00D Unique address.EXT=32F310E2A608FF.00D
15. Logical Port 14 OWL address EXT=0.00E
Unique address.EXT=32F310E2A608FF.00E
16. Logical Port 15 XML address EXT=0.00F
Unique address.EXT=32F310E2A608FF.00F
17. Logical Port 16 RDF address EXT=0.010
Unique address.EXT=32F310E2A608FF.010
18. Logical Port 17 ATTOVIEW address EXT=0.011
Unique address.EXT=32F310E2A608FF.011
19. Logical Port 18 IoT address EXT=0.012
Unique address.EXT=32F310E2A608FF.012
20. Logical Ports 19 to 399 Native Applications
21. Logical Ports 400 to 512 Legacy Applications
Attobahn Cell Frame Fast Packet Protocol (ACF2P2)

Figure 13:
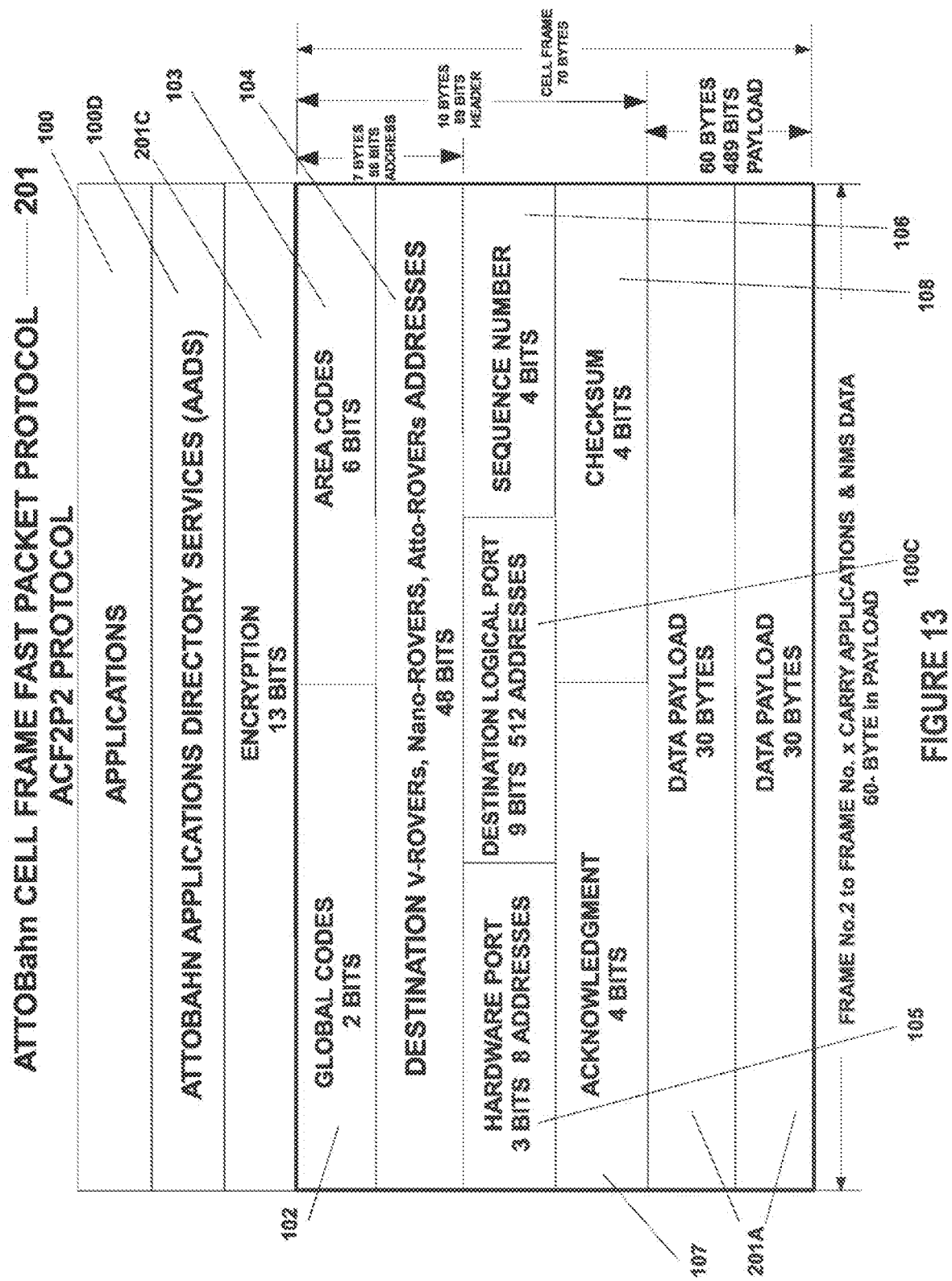
FIG. 13.0 is an illustration of Attobahn's cell frame fast packet protocol (ACFP) consisting of a 10-byte header and a 60-byte payload which is an embodiment of this invention.

FIG. 13.0 shows the Attobahn Cell Frame Fast Packet Protocol (ACF2P2) 201 which is an embodiment of this invention.

The ACF2P2 cell frame has a 10-byte header and a 60-byte payload. The header consists of:

1. Global Codes Addressing & Global Gateway Nucleus Switches

The Global Code 102 which are used to identify the geographical region in the world where the cell frame device is located. There is four Global Codes that divides the world in the geographical and economics regions. The four Attobahn regions mimic the four world business regions:

North America (NA)
Europe, Middle East & Africa (EMEA)
Asia Pacific (ASPAC)
Caribbean Central & South America (CCSA)

Figure 14:
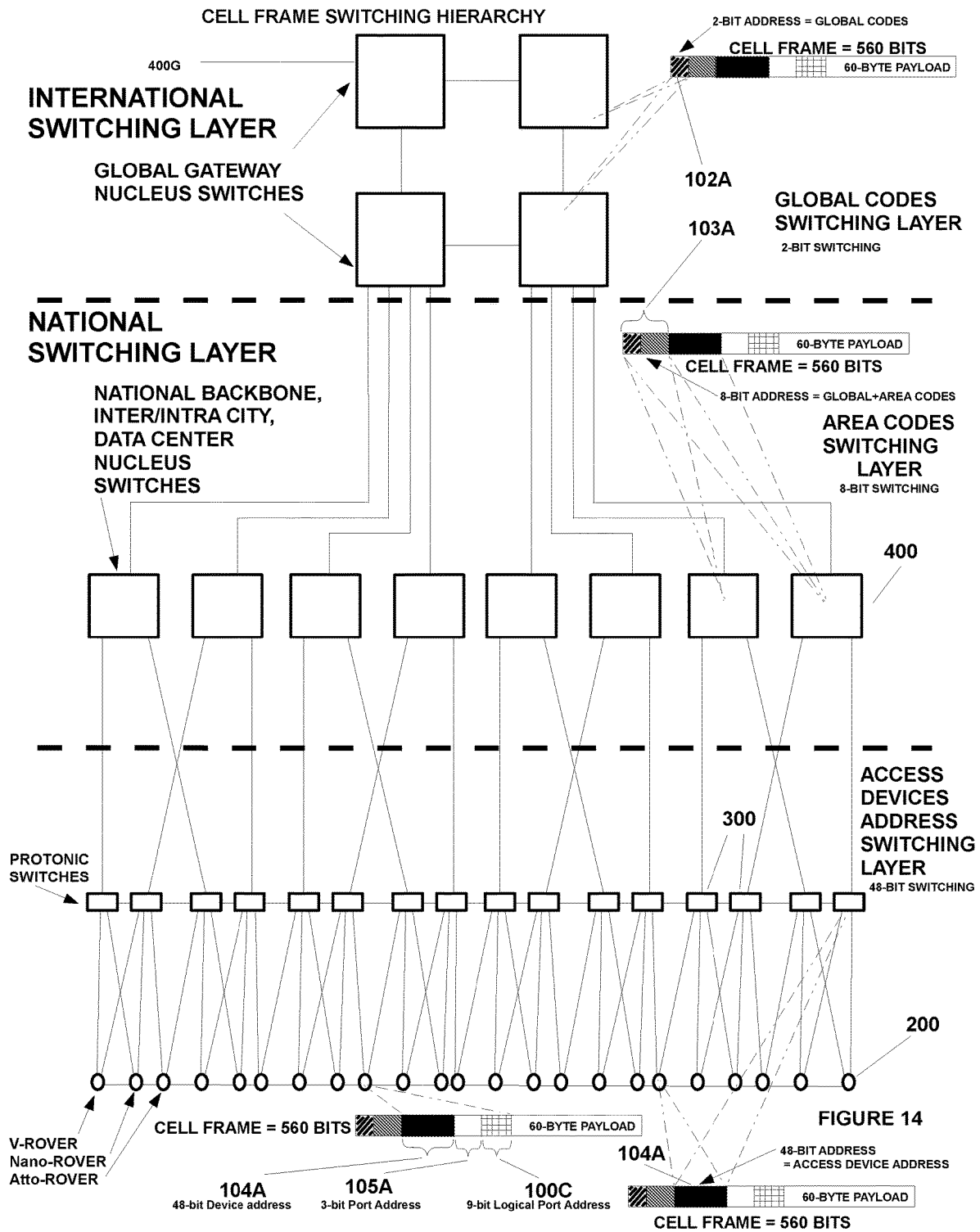
FIG. 14.0 is an illustration of Attobahn Cell Frame Switching Hierarchy which is an embodiment of this invention.

As illustrated in FIG. 14.0 which is an embodiment of this invention, each Global Code in the ACF2P2 cell frame utilizes the first two bits (bit-1 and bit-2) 102A of the 560-bit frame. The Attobahn Global Gateway and National Backbone Nucleus Switches 300 are the only devices in the network that read these two bits and use their values to make switching decisions. This network switching design strategy reduces the latency that each cell frame endures through the Global Gateway and National Backbone Nucleus Switches, thus increasing the switching speed of these switches. Therefore, these switches make their switches decisions on only two bit and completely ignores the other 558 bits in the cell frame. The switching tables of these switches are very small and greatly reduce the cell processing time in each switch. Hence these switches have a very high capacity of switching cells frames at high speeds.

The Global Gateway Nucleus Switches send the cell frame to its output port that connects to the National Backbone Nucleus Switch with the Global Code where the frame is designated to terminate. The Backbone switch reads only the Area Code 6-bit address 103 of the 650-bit frame that came in from the Global Gateway Switch and routes it into the domestic network associated with the designated Area Code.

2. Area Codes Address & National, City & Data Centers Nucleus Switches

The ACF2P2 uses 6 bits to represent the 64 Area Codes of the network and the countries that specific Inter/Intra City and Data Center Nucleus Switches 300 are distributed across. As shown in FIG. 13.0, each Global Code has 64 Area Codes 103 beneath them and encompasses bit-3 to bit-8 of the 560-bit frame which is an embodiment of this invention.

The National, inter/intra city, and data center Nucleus Switches are the only devices that read and make switching decisions based on the Area Codes six (6) bits and the Global Codes two (2) bits 103A. These switches do not read the access devices' addresses but focus only on the first 8 bits of the cell frame as shown in FIG. 14.0.

These switches accept the cell frames from the Protonic Switches 300 as shown in FIG. 13.0 which is an embodiment of this invention, and analyze the first two bits to determine if the cell frame is designated for a system within its Global Code or for a foreign Global Code. If the cell frame is designated for its local Global Code, the Nucleus switch examines the next six bits to establish which Area Code to send the frame. If the Global Code is not local, then the Nucleus Switch only reads the first two bits in the frame and does not bother to look at the next six Area Code bits because it is not necessary since the frame will leave the neighborhood. The switch hands off the cell frame to the nearest Global Gateway switch associated with its geographical area.

This effective switching methodology of only reading and analyzing the two Global Code bits, in the case of dealing with a foreign Global Code, that simplifies the network switching processing and subsequently radically reducing the switching time or latency. This switching design also reduces the size of the switching tables in the Nucleus Switches because they only have to deal with first two or eight bits 103A of each cell frame.

3. Access Devices Addresses & Switching

The ACF2P2 uses 48 bits to represent the access network devices addresses 104 such as the V-ROVER 200, Nano-ROVER 200, and Atto-ROVER 200. Also, the Protonic Switches read these addresses to make switching decision to connect access devices within their molecular domain. As shown in FIG. 13.0, each access device address encompasses bit-9 to bit-64 of the 560-bit frame which is an embodiment of this invention.

As illustrated in FIG. 13.0 V-ROVER 200, Nano-ROVER 200, Atto-ROVER 200, the Protonic Switches are the only devices that read and make switching decisions based on the 48 bits from bit positions 9 to 64 bits 104. These devices switching functions as shown in FIG. 14.0 do not read the Global and Area Codes but focus only on the bits 9-64 addresses 104A of the cell frame.

As illustrated in FIG. 14.0 which is an embodiment of this invention, the V-ROVERS, Nano-ROVERs, and Atto-ROVERs read each cell frame's bit 9 to bit 64, i.e., 48 bits 104A, to determine if the frame is designated to terminate in its device. If is designated for that V-ROVERS, Nano-ROVERs, and Atto-ROVERs device, then it reads the next three bits, bit 65 to bit 67 i.e., the 3 bits 105A which is the port address 105 (FIG. 12.0) and identify which of its eight (8) ports to terminate the cell frame. The device at this point reads the next 9 bits from bit 68 to bit 76, the logical port address 100C. The Rover selects the correct logical port address from those nine (9) bits, where the payload data is sent to the decryption process to restore the original application data.

The V-ROVERS, Nano-ROVERs, and Atto-ROVERs access devices primary focus when they examine a cell frame is to first analyze the 48-bit access device destination address. After analysis of this address, once the cell frame is not designated for that access device, it immediately looks up its switching tables, to see if the address matches one of its two neighboring access devices. If the frame is designated for one of them, then the device switch that frame to its designated neighbor. If the frame is not designated for one of it neighbor, the frame is sent to its primary adopted Protonic Switch. This design arrangement allows the device to rapidly switch cell frames by only reading the 48-bit address for the access devices and completely ignoring the Global Code, Area Code, Port, and Logical port addresses. This reduces latency through the access devices and improving the switching times in the overall network infrastructure which is an embodiment of this invention.

4. Protonic Address Switching

As illustrated in FIGS. 13.0 and 14.0 which is an embodiment of this invention, the Protonic Switches act as the switching glue between the Area Codes and Global Codes Nucleus Switches and the access devices (V-ROVERS, Nano-ROVERs, and Atto-ROVERs). These switches only focus on the 48-bit access devices 104 in FIGS. 13.0 and 104A in FIG. 14.0, and ignore all Global Codes, Area Codes, access devices hardware and logical ports addresses in the cell frame. This switching approach at the intermediate level of Attobahn network switching architecture layers the switching responsibility across the network which reduces the processing time within the switches and access devices. This improves the efficiency and switching latency across the infrastructure.

The Protonic Switch receives cell frames from access devices and examines the 48-bit access device address from bit 9 to bit 56 in the frame 104A. The Switch looks up its switching tables to determines if the designated address is within its molecular domain and if it is then the frame is switched to access device of interest. If the address is not within the Protonic Switch domain, the cell frame is switch to the one its two connected Intra City Nucleus Switch as illustrated in FIG. 13.0 which is an embodiment of this invention.

If the cell frame is within the Protonic Switch molecular domain, the switch sends the cell frame to the designated access device.

5. Host-to-Host Communications

Figure 15:
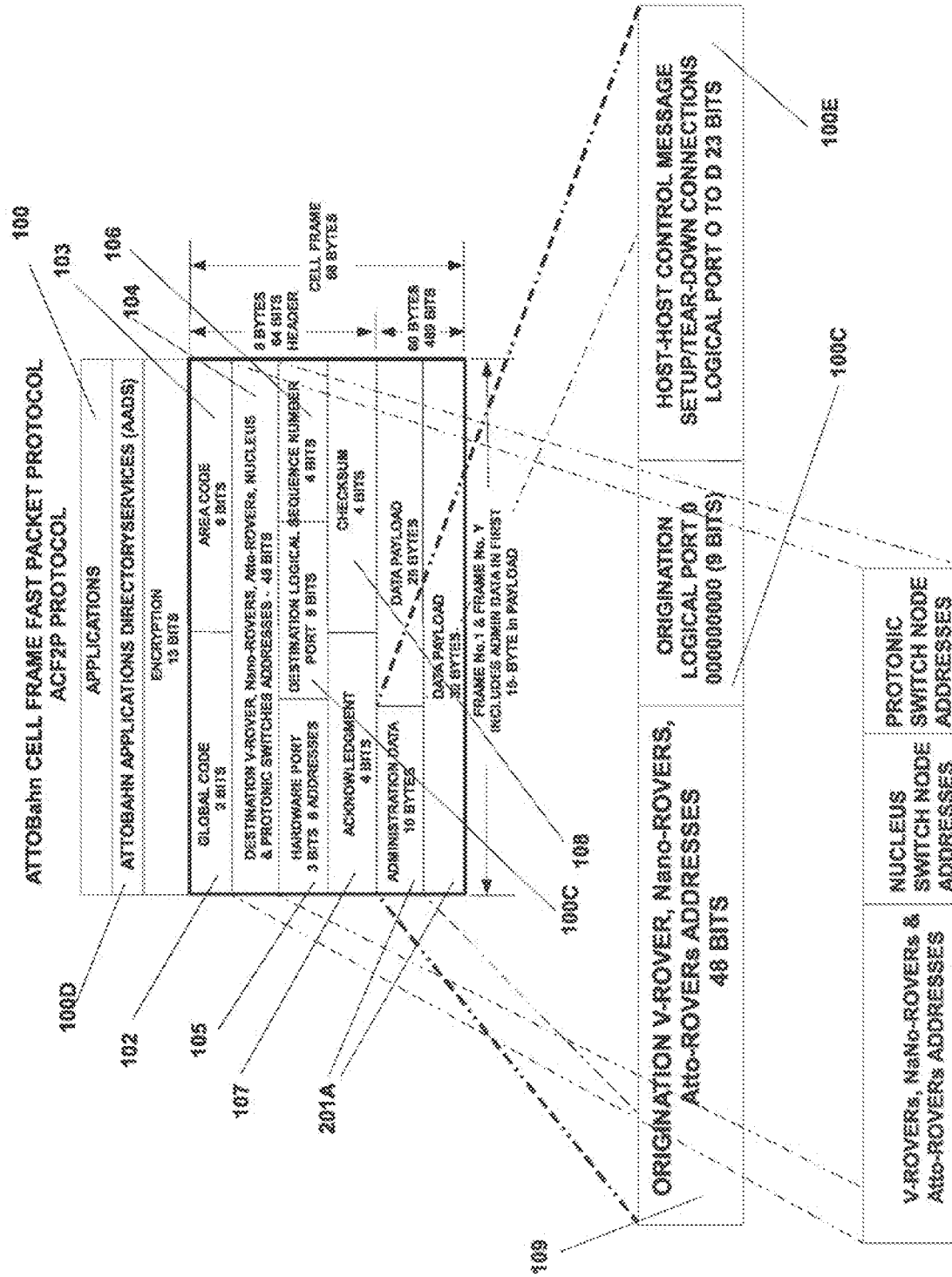
FIG. 15.0 is an illustration of Attobahn's cell frame fast packet protocol (ACFP) with a breakdown of the Admin logical port description which is an embodiment of this invention.

FIGS. 15.0 and 16.0 show the cell frame protocol which is an embodiment of this invention. When a native Attobahn application, APP 1 needs to communicate with a corresponding APP 2 service across the network, the following processes are activated:

1. The APP 1 100 requesting service sends out a Attobahn APP Service Request (AASR) 100E message to communicate with APP 2, as illustrated in FIGS. 15.0 and 16.0 which is an embodiment of this invention, to the local Attobahn Applications & Security Directory Service (ASDS) 100D.
2. After the local Attobahn Applications & Security Directory Service (ASDS) 100D, as illustrated in FIGS. 15.0 and 16.0 which is an embodiment of this invention, receives the AASR message. It checks the database for the remote APP 2; its associated logical port address 100C; the Attobahn remote network Destination hardware resource (V-ROVER, Nano-ROVER, Atto-ROVER, or Data Center Nucleus Switch) address 104, where the application's computing system is connected; and the Originating hardware resource address 109 associated with APP 1.
3. The local ASDS Security carries out an authentication check to determine if the end user has rights to request the desire service at APP 2. If the rights are given, then the local ASDS sends the approval message to the APP 1. If the rights are not given, then the request is denied. Simultaneously, the APPI uses the approval information obtained from the local ASDS to activate the Encryption 201C process to the assigned local Logical Port (LP3 100C) to protect all data that traverses the port.
4. Next, the AAPI 201B sends out the message from the local ASDS with the remote APP 2; its associated Logical Port LP3 100C address; the Attobahn remote network hardware resource (V-ROVER, Nano-ROVER, Atto-ROVER, or Data Center Nucleus Switch) address, where the application's computing system is connected; and the Originating hardware resource address associated with APP 1 to the remote network device ASDS.
5. The remote ASDS receives the message for access to APP 2 and carries out security authentication checks to see if the requesting APP 1 has the rights to access APP 2. If the requesting APP 1 is approved, then access is given to the requested APP 2 via its assigned logical port. If APP 1 request is not approved by the remote ASDS, then access to APP 2 is denied.
6. After the APP Authentication process, the remote AAPI opens connection to that logical port and APP 2.
7. The encryption process for the selected logical port is activated for all out going APP 2 data designated for the requesting APP 1.
8. Once the encryption is turned on, the remote AAPI sends back a Host-to-Host Communication Service (HHCS) control message to set up a connection between APP 1 and APP 2.
9. The HHCS connection setup immediately invokes the 4-bit sequence number (SN) 106 that labels each cell frame from 0-15 numbering sequence. This process allows up to 16 outstanding cell frames between two logical ports and their associated applications' communications across the Attobahn network.
10. Each cell frame is acknowledged when it is received by the distant end logical port. The acknowledgment (ACK) 4-bit word 107 is sent to the sending end that the cell frame originated. The ACK word is an exact replica of the sent cell frame sequence number. When a cell frame is sent out with its sequence number, that same sequence number value is sent back in ACK value to the originating end.

If sixteen frames ranging from 0-15 4-bit sequence numbers are sent out and the acknowledgment of 0-15 4-bit ACK numbers within that range is not return and a new sequence of 0-15 4-bit words are received, then a frame was not received and that missing frame ACK number correlating to the missing frame sequence number is retransmitted by the APPI.

As an example, if frames sequence numbers (SN) 0-15, i.e. 0000 to 1111 is send over the network from one logical port to a distant access device logical port. The sequence number 0000 to 1110 is received but not SN 1111, then the AAPI at the distant access device will send back ACK numbers 0000 to 1110 but not 1111, since it was not received.

While the originating access device continues to send a new group of SN 0000 to 1111 and the distant end starts to send back ACK number 0000 before the first group ACK 1111 was received, the AAPI at the originating end will immediately recognized that cell frame 1111 associated with the first group of sixteen frames was not received. Once the originating access device AAPI recognizes that frame 1111 was not acknowledged, it immediately retransmits the lost frame. This cell frame sequence numbering and acknowledgment processes as illustrated in FIGS. 14.0 and 15.0 is an embodiment of this invention.

Figure 16:
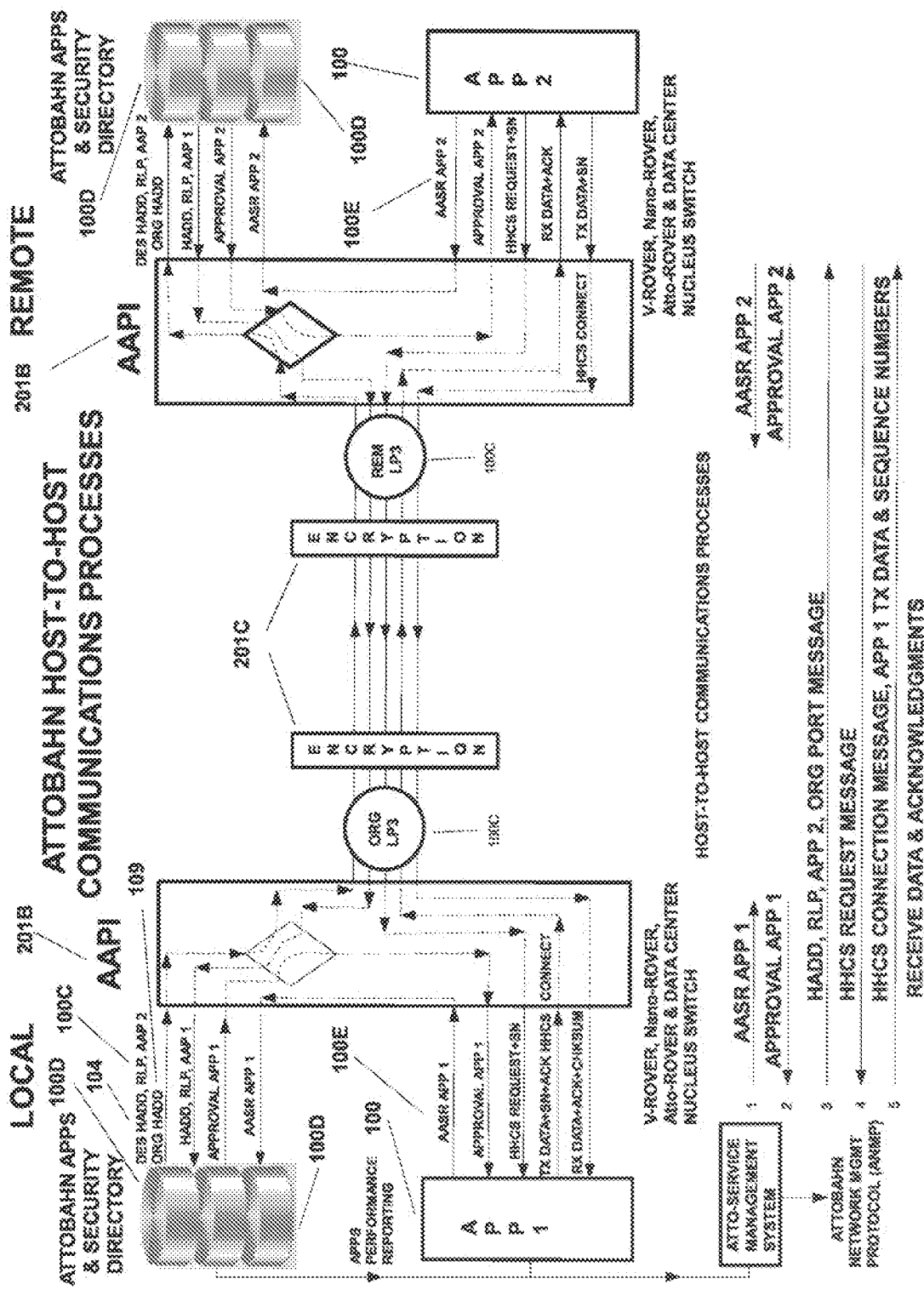
FIG. 16.0 is an illustration of Attobahn's host-to-host communications processes which is an embodiment of this invention.

The AAPI allows a maximum of sixteen outstanding frames as illustrated in FIG. 16.0 which is an embodiment of this invention. A copy of the sixteen frames that were sent is kept in memory until they are all acknowledged from the distant access device AAPI, and that ACK is received by the originating access device AAPI. Once these frames are acknowledged, then the originating device remove them from memory.

11.0 As illustrated in FIGS. 15.0 AND 16.0 which is an embodiment of this invention, each cell frame is accompanied with a checksum of 4 bits to ensure integrity of the data bits received at both ends of the host-to-host communication across Attobahn network.

12.0 When an APP on the remote device needs to communicate with another APP across the network the processes described from step 1.0 to 9.0 is repeated as illustrated in FIGS. 11A and 11B and 16.0 which is an embodiment of this invention.

6. Connection Oriented Protocol

The Attobahn Cell Frame Fast Packet Protocol is a connection oriented protocol as shown in FIGS. 15.0 and 16.0 which is an embodiment of this invention. The cell frame consists of a 10-byte overhead that includes the Global Codes 102, Area Codes 103, Destination Devices Addresses 104, Destination Logical port 100C, hardware port number 105, frame sequence number bits 106, acknowledgment bits 107, the check sum bits 108, and the 480-bit payload 201A.

The protocol is designed to have only the Destination Device Address 104 in the overhead bits of each cell frame and does not carry the origination device address in the overhead bits. This design arrangement reduces the amount of information that the V-ROVER, Nano-ROVERs, Atto-ROVERs, Protonic Switches, and Nucleus Switches have to process. The Origination Device Address is sent once to the destination device throughout the entire host-to-host communications.

The origination address 109 is contained in the cell frame payload first 48 bits as shown in FIG. 15.0 which is an embodiment of this invention. The first cell frame that carries the Local APP 1 message from the ASDS to the Remote ASDS to request access to communicate with AAP 2 contains the Origination Device Address 109, the Logical Port 0 that is associated with the Attobahn ADMIN APP 100F (FIG. 6.0), the Remote Logical Port 100C associated with APP 2 ID information.

The Origination address is placed into the initial cell frame payload's first 48 bits via the Attobahn ADMIN APP that is connected to Logical Port 0 100C as illustrated in FIG. 6.0. which is an embodiment of this invention. The Logical Port 0 address 100C is also assigned into bit 49 to 57 of the first cell frame sent to the remote access device. Once the Origination address is received at the remote end and the host-to-host communications is established, the two logical ports 100C are connected for the duration of the communications between the APP 1 and APP 2. This connection allows both Attobahn device to only use the destination address of each device to send data (cell frames) between them. The Origination Address from APP 1 is not needed anymore since the connection between the APPs remains up until their purpose is accomplished and the connection is tear down.

The ADMIN APP is only used to send network administration data such as Origination Hardware Address, network public messages, and members announcements network operational status updates, etc.

V-Rover Design

1. Physical Interfaces

Figure 17A:
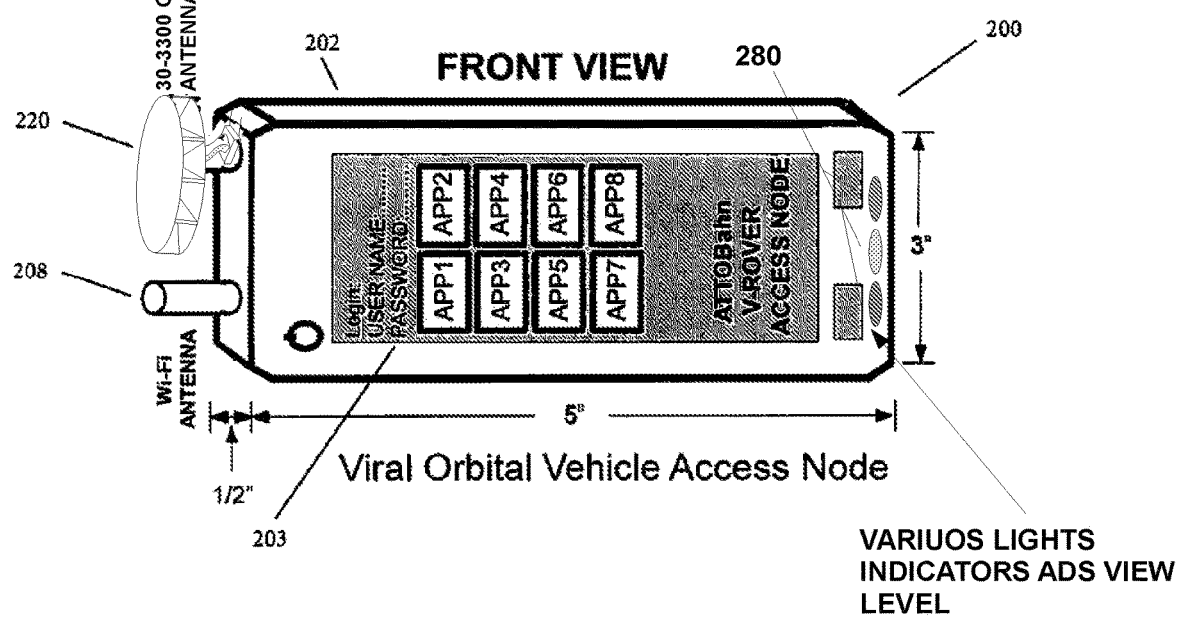
FIGS. 17.0-17A is an illustration of the Viral Orbital Vehicle V-ROVER access communications device housing front and non-connector ports side views which is an embodiment of the invention.
FIG. 17B is an illustration of the Viral Orbital Vehicle V-ROVER access node communications device housing rear, connector ports side, and the DC power connector bottom views which is an embodiment of the invention.
Figure 17B:
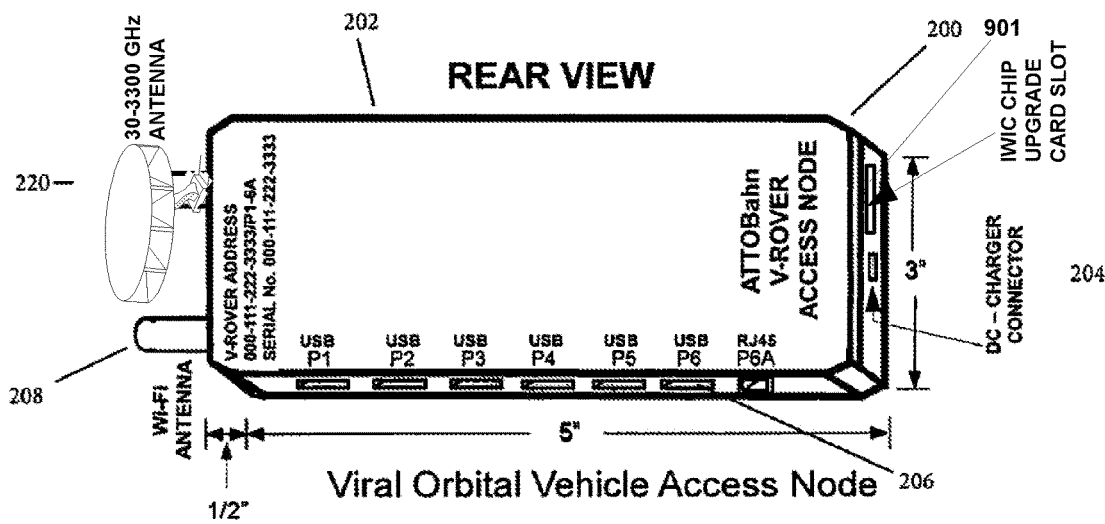

As an embodiment of this invention FIGS. 17A and 17B shows the Viral Orbital Vehicle, V-ROVER communications device 200 that has a physical dimension of 5 inches long, 3 inches wide, and ½ inch high. The device has a hard, durable plastic cover chasing 202 with a glass display screen 203 on the front of the device. The device is equipped with a minimum of 8 physical ports 206 that can accept high-speed data streams, ranging from 64 Kbps to 10 GBps from Local Area Network (LAN) interfaces which is not limited to a USB port, and can be a high-definition multimedia interface (HDMI) port, an Ethernet port, a RJ45 modular connector, an IEEE 1394 interface (also known as FireWire) and/or a short-range communication ports such as a Bluetooth, Zigbee, near field communication, or infrared interface that carries TCP/IP packets or data streams from the Attobahn Application Programmable Interface (AAPI); PCM Voice or Voice Over IP (VOIP), or video IP packets.

The V-ROVER device has a DC power port 204 for a charger cable to allow charging of the battery in the device. The device is designed with high frequency RF antenna 220 that allows the reception and transmission of frequencies in the range of 30 to 3300 GHz. In order to allow communications with WiFi and WiGi, Bluetooth, and other lower frequencies system, the device has a second antenna 208 for the reception and transmission of those signals.

Ads Monitoring & Viewing Level Indicators

As shown in FIG. 17A which is an embodiment of this invention, the V-ROVER has three bevel indent holes 280 equipped with three LED lights/Indicators, on the front face of the glass display. These lights are used as indicators for the level of Advertisements (ADS) viewed by the household, business office, or vehicle recipients/users within them.

The LED light/Indicator ADS indicators operates in the following manner:
1. Light/Indicator A LED lights up when the user of the Attobahn broadband network services was exposed to a specific high number of ADS per month.
2. Light/Indicator B LED lights up when the user of the Attobahn broadband network services was exposed to a specific medium number of ADS per month.
3. Light/Indicator C LED lights up when the user of the Attobahn broadband services was exposed to a specific low number of ADS per month.

These LEDs are controlled by the ADS APP of the APPI located on Logical Port 13 Attobahn Ads APP address EXT=0.00D, Unique address.EXT=32F310E2A608FF.00D. The ADS APP drives the ADS views—text, image, and video to the viewer display screens (cellphones, smartphones, tablets, laptops, PCs, TVs, VRs, gaming systems, etc.) and is designed with a ADS counter that keeps track of every AD that is shown on these displays. The counter feds the three LEDs to turn them on and off when the displayed ADS amounts meet certain thresholds. These displays let the user know how many ADS they were exposed at any given instant in time. This AD monitoring and indications levels are an embodiment of this invention on the V-ROVER device.

As display in FIG. 8.0 which is an embodiment of this invention, the ADS APP also provides the ADS Monitor & Viewing Level Indicator to be displayed on the display screens (cellphones, smartphones, tablets, laptops, PCs, TVs, VRs, gaming systems, etc.) of the end user. The ADS Monitor & Viewing Level Indicator (AMVI) displays on the user screen in the form of a vertical bar that superimposes itself over whatever is being shown on the screen. The AMVI vertical bar follows the same color indications as the ones displayed on the front face glass bevels of the V-ROVERs, Nano-ROVERs, and Atto-ROVERs. The vertical bar AMVI are designed to display on the user screen as follows:
1. The light/indicator A on the vertical bar becomes bright (while light/indicator B and C remain faint) when the user of the Attobahn broadband network services was exposed to a specific high number of ADS per month.
2. The light/indicator B on the vertical bar becomes bright (while light/indicator A and C remain faint) when the user of the Attobahn broadband network services was exposed to a specific medium number of ADS per month.
3. The light/indicator C on the vertical bar becomes bright (while light/indicator A and B remain faint) when the user of the Attobahn broadband services was exposed to a specific low number of ADS per month.

2. Physical Connectivity

Figure 18:
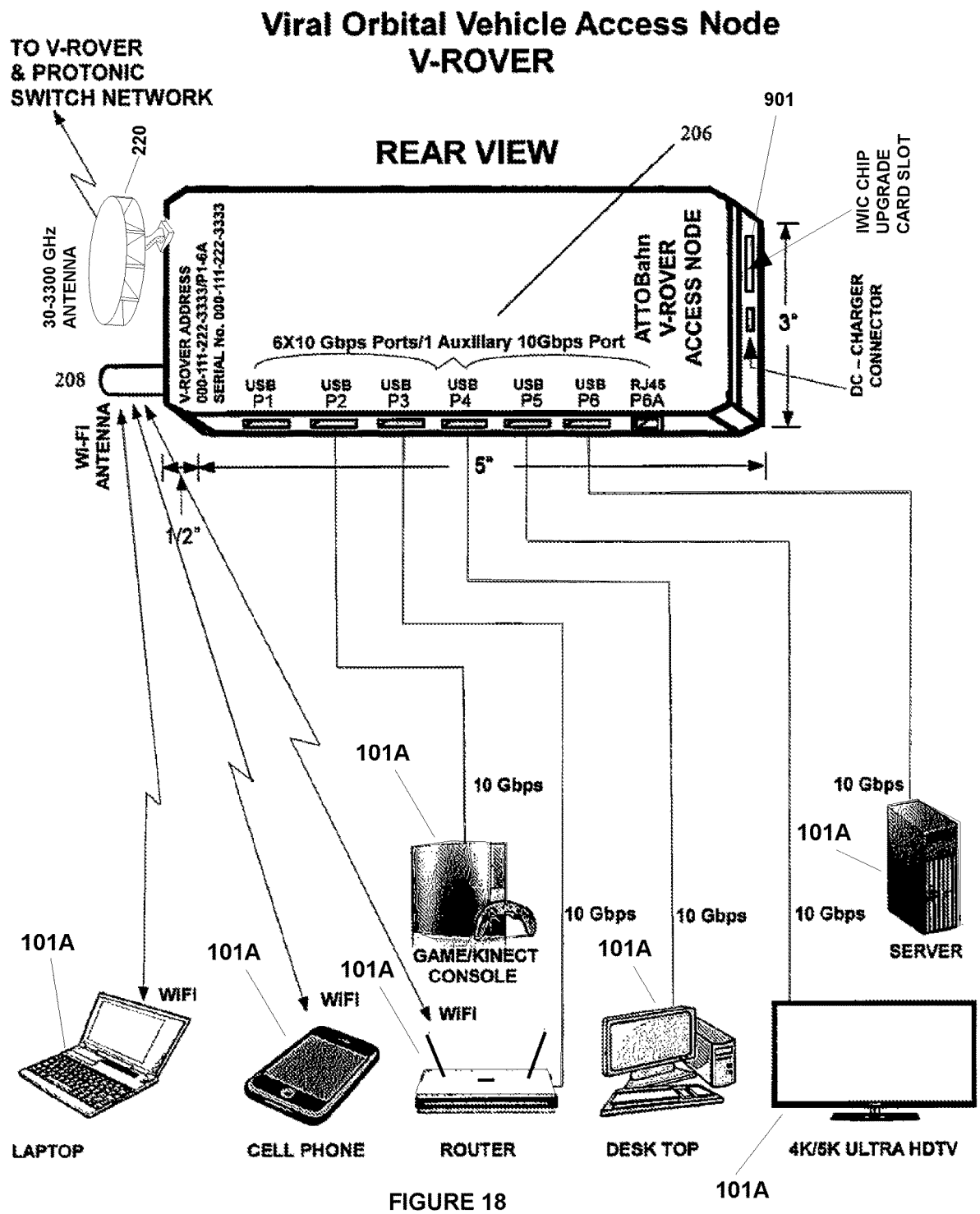
FIG. 18.0 shows the Viral Orbital Vehicle V-ROVER access node communications device housing rear, connector ports side, and the DC power connector bottom views with the device connected to a series of typical end user systems which is an embodiment of the invention.

As an embodiment of this invention FIG. 18.0 shows the physical connectivity between the V-ROVER device ports 206; WiFi and WiGi, Bluetooth, and other lower frequencies antenna 208; and the high frequency RF antenna 220 and 1) end user devices and systems but not limited to laptops, cell phones, routers, kinetic system, game consoles, desktop PCs, LAN switches, servers, 4K/5K/8K ultra high definition TVs, etc.; 2) and to the Protonic Switch.

3. Internal Systems

Figure 19:
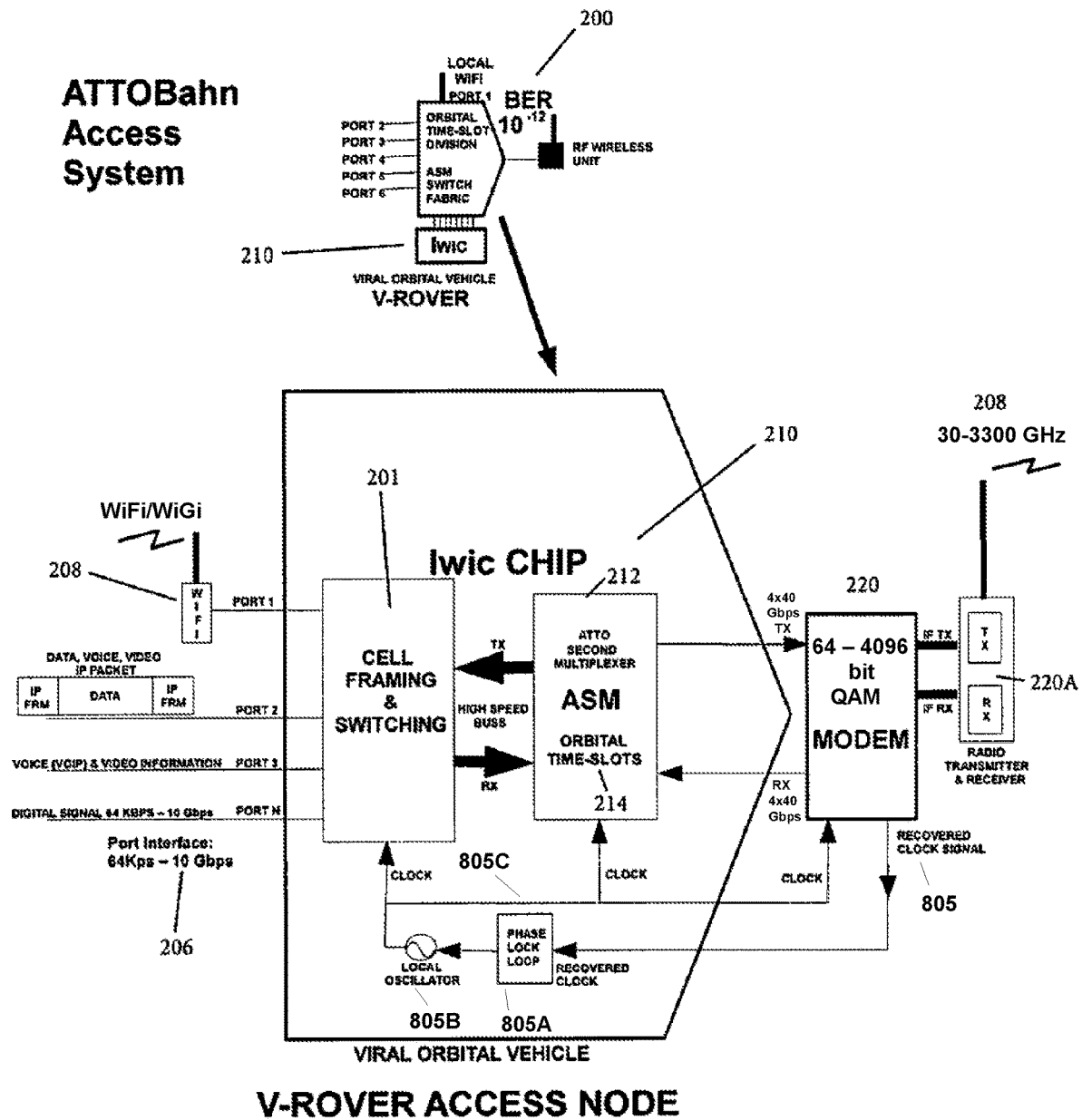
FIG. 19.0 is a series of block diagrams that illustrates the internal operations of the Viral Orbital Vehicle V-ROVER access node communications device on end user information and digital streams which is an embodiment of this invention.

As an embodiment of the invention FIG. 19.0 shows the internal operations of the V-ROVER communications devices 200 with. The end user data, voice, and video signals enter the device ports 206 and low frequency antenna (WiFi and WiGi, Bluetooth, etc.) 208 and are clock into the cell framing and switching system using the highly-stabilized clocking system 805C with its internal oscillator 805B and phase lock loop 805A that is referenced to the recovered clocking signal obtained from the demodulator section of the modem 220 received digital stream. Once the end user information is clock into the cell framing system, it is encapsulated into the viral molecular network cell framing format, where an Origination address, located in frame 1 of host-host communications between the local and remote Attobahn network device (see FIGS. 15.0 and 16.0 for more detail information the Originating Address) and destination ports 48-digit number (6-byte) schema address headers, using a nibble of 4 bytes per digit are inserted in the cell frame 10-byte header. The end user information stream is broken into 60-byte payloads cells which are accompanied with their 10-byte headers.

As illustrated in FIG. 19.0 which is an embodiment of this invention, the cell frames are placed onto the Viral Orbital Vehicle (V-ROVER, Nano-ROVER, and Atto-ROVER) high-speed buss and delivered to the cell switching section of the IWIC Chip 210. The IWIC Chip switches the cell and sent it via the high-speed buss to the ASM 212 and placed into a specific Orbital Time Slot (OTS) 214 for transport the signal to the Protonic Switch or one of its neighboring Viral Orbital Vehicle if the traffic is staying local within the atomic molecular domain. After the cell frames passes through the ASM, they are submitted to the 4096-bit QAM modulator of the modem 220. The ASM develops four high-speed digital streams that are sent to the modem and after individually modulating each digital stream into four intermediate frequency (IF) signals. The four IFs are sent to the RF system 220A mixer stage where the IF frequencies are mixed with their RF carriers (four RF carriers per Viral Orbital Vehicle device) and transmitted over the antenna 208.

4. TDMA ASM Framing & Time Slots

Figure 20:
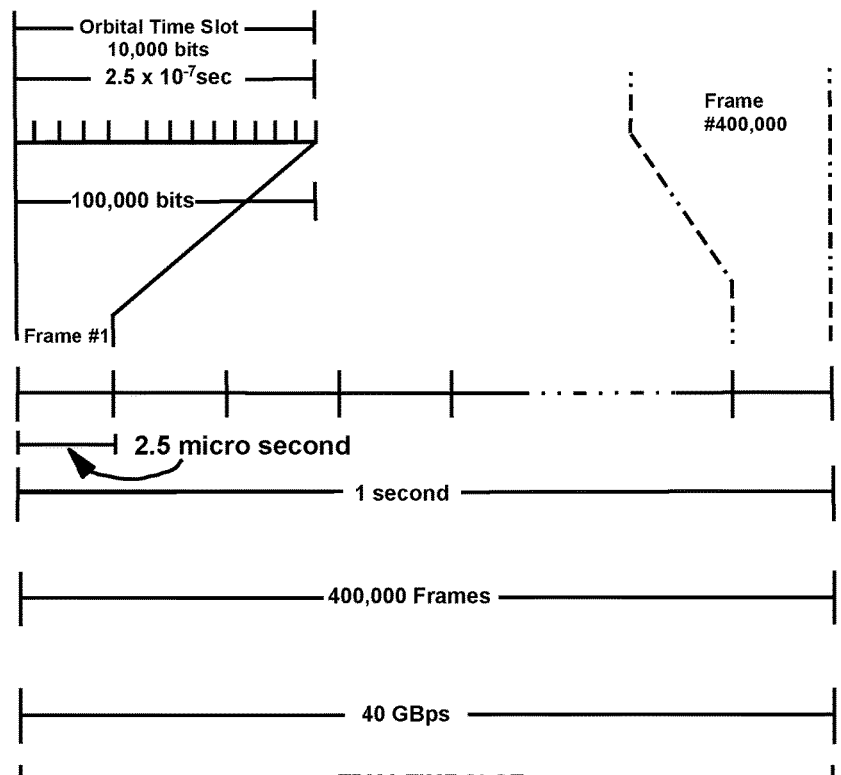
FIG. 20.0 illustrates the Atto Second Multiplexer (ASM) time division frame format of the digital cell frame stream which is an embodiment of this invention.

As an embodiment of the invention FIG. 20.0 illustrates the ASM 212 framing format that consists of Orbital Time Slots (OTS) 214 of 0.25 micro-second that moves 10,000 bits within that time period. Ten (10) OTS 214A frames of 0.25 micro-second makes up one ASM frame with an orbital period of 2.5 micro-second. The ASM circuitry moves 400,000 ASM frames 212A per second. The OTS 10,000 bits every 0.25 micro-second results in 40 GBps. This framing format is developed in the Viral Orbital Vehicle, Protonic Switch, and the Nucleus Switch across the Viral Molecular network. Each of these frames are placed into a time slot of the Time Division Multiple Access (TDMA) frame that communicates with both the Protonic Switch and neighboring ROVERs.

5. V-Rover System Schematics

Figure 21:
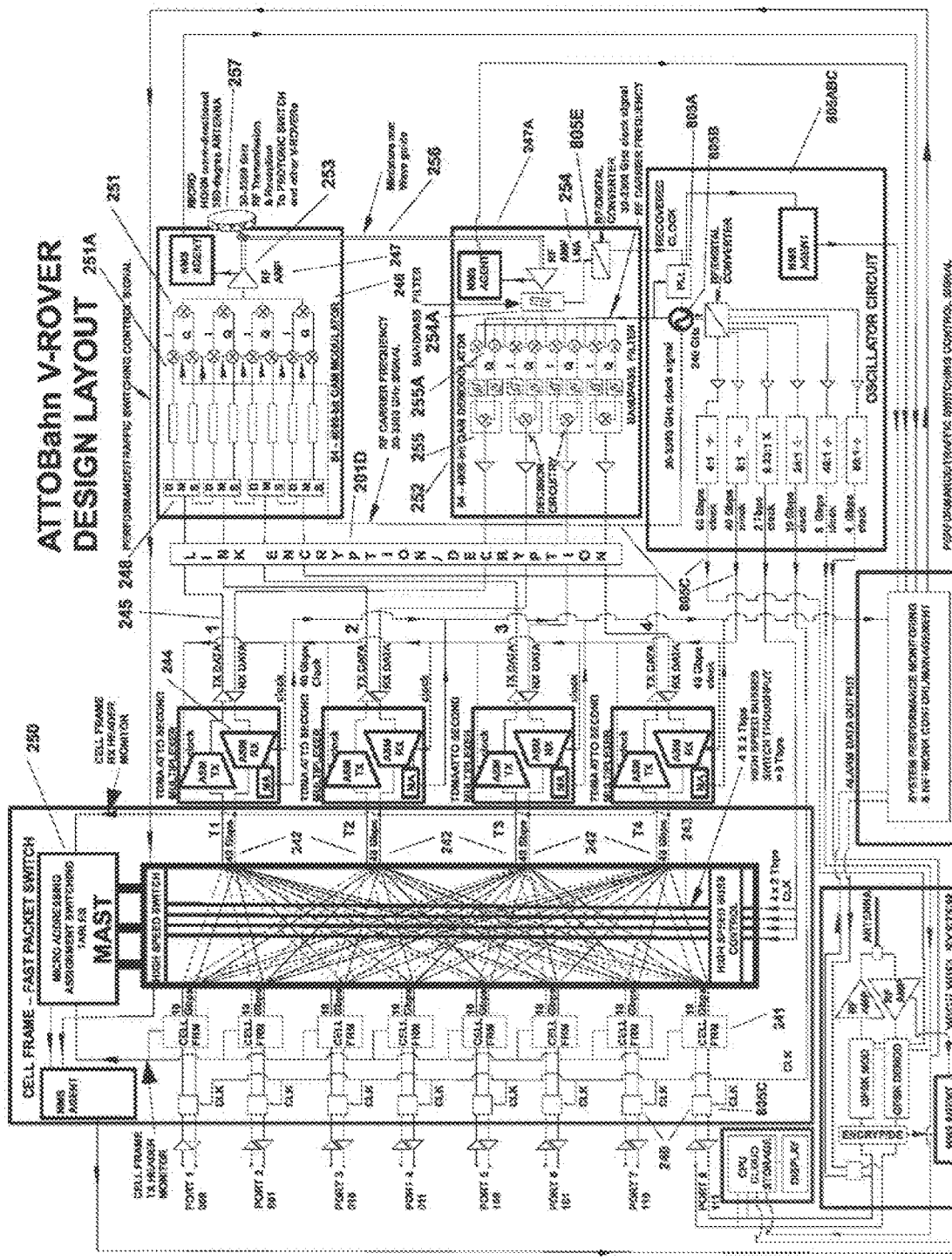
FIG. 21.0 illustrates the V-ROVER technical schematic layout of its cell frame switching fabric, ASM, QAM modems, RF amplifier and receiver, management system, and CPU which is an embodiment of this invention.

FIG. 21.0 is an illustration of the V-ROVER design circuitry schematics which is an embodiment of this invention, gives a detailed layout of the internal components of the device. The eight (8) data ports 206 are equipped with input clocking speed of 10 GBps that is synchronized to derived/recovered clock signal from the network Cesium Beam oscillator with a stability of one part in 10 trillion. Each port interface provides a highly stable clocking signal 805C to time in and out the data signals from the end user systems.

End User Port Interface

The ports 206 of the V-ROVER consists of one (1) to eight (8) physical USB; (HDMI); an Ethernet port, a RJ45 modular connector; an IEEE 1394 interface (also known as FireWire) and/or a short-range communication ports such as a Bluetooth; Zigbee; near field communication; WiFi and WiGi; and infrared interface. These physical ports receive the end user information. The customer information from a computer which can be a laptop, desktop, server, mainframe, or super computer; a tablet via a WiFi or direct cable connection; a cell phone; voice audio system; distribution and broadcast video from a video server; broadcast TV; broadcast radio station stereo, audio announcer video, and radio social media data; Attobahn mobile cell phone calls; news TV studio quality TV systems video signals; 3D sporting events TV cameras signals, 4K/5K/8K ultra high definition TV signals; movies download information signal; in the field real-time TV news reporting video stream; broadcast movie cinema theaters network video signals; a Local Area Network digital stream; game console; virtual reality data; kinetic system data; Internet TCP/IP data; nonstandard data; residential and commercial building security system data; remote control telemetry systems information for remote robotics manufacturing machines devices signals and commands; building management and operations systems data; Internet of Things data streams that includes but not limited to home electronic systems and devices; home appliances management and control signals; factory floor machinery systems performance monitoring, management; and control signals data; personal electronic devices data signals; etc.

Micro Address Assignment Switching Tables (Mast)

The V-ROVER port clocks in each data type via a small buffer 240 that takes care of the incoming data signal and the clocking signal phase difference. Once the data signal is synchronized with the V-ROVER clocking signal, the Cell Frame System (CFS) 241 scrips off a copy of the cell frame Destination Address and sends it to Micro Address Assignment Switching Tables (MAST) system 250. The MAST then determines if the Destination Address device ROVER is within the same molecular domain (400 V-ROVERs, Nano-ROVERs, and Atto-ROVERs) as the Originating Address ROVER device.

If the Origination and Destination addresses are in the same domain, then the cell frame is switch via anyone of the four 40 GBps trunk ports 242 where the frames is transmitted either to the Protonic Switches or the neighboring ROVERs. If the cell frames Destination Address is not in the same molecular domain as the Origination Address ROVER device, then the cell switch switches the frame to trunk port 1 and 2 which are connected to the two Protonic Switches that control the molecular domain.

The design to have a frame whose Destination Address ROVER device is not within the local molecular domain, be automatically sent to the Protonic Switching Layer (PSL) of the network, is to reduce the switching latency through the network. If this frame is switched to one of the neighboring ROVERs, instead of going directly to a Protonic Switch, the frame will have to transit many ROVER devices, before it leaves the molecular domain to its final destination in another domain.

Switching Throughput

The V-ROVER cell frame switching fabric which is an embodiment of this invention, uses a four (4) individual busses 243 running at 2 TBps. This arrangement gives each V-ROVER cell switch a combined switching throughput of 8 GBps. The switch can move any cell frame in and out of the switch within an average of 280 picoseconds. The switch can empty any of the 40 GBps trunks 242 of data within less than 5 milliseconds. The four (4) 40 GBps data trunks' 242 digital streams are clock in and out of the cell switch by 4×40 GHz highly stable Cesium Beam 800 (FIG. 107.0) reference source clock signal which is an embodiment of this invention.

Atto Second Multiplexing (ASM)

The V-ROVER ASM four trunks signals are fed into the Atto Second Multiplexer (ASM) 244 via the Encryption System 201C. The ASM places the 4×40 GBps data stream into the Orbital Time Slot (OTS) frame as displayed in FIG. 19.0. The ASM ports 245 one (1) and two (2) output digital streams are inserted into the TDMA time slots then send to the QAM modulators 246 for transmission across the millimeter wave radio frequency (RF) links. The ASMs receive TDMA digital frames from the QAM demodulators, demultiplex the TDMA time slot signal designated for its V-ROVER and OTS back into the 40 GBps data streams. The cell switch trunk ports 242 monitor the incoming cell frames from the two Protonic Switches (always on ASM Port 1 and 2 and cell switch T1 and T2) and the two neighboring ROVERs (always on ASM Port 3 and 4 and cell switch T3 and T4).

The cell switch trunks monitor the four incoming 40 GBps data streams 48-bit Destination Address in the cell frames and sent them to the MAST 250. The MAST examines the addresses and when the address for the local ROVER is identified, the MAST reads the 3-bit physical port address and instructs the switch to switch those cell frames to their designated ports.

When the MAST determines that a 48-bit Destination Address is not for its local ROVER or one of its neighbors, then it instructs the switch to switch that cell frame to T1 or T2 toward the one of the two Protonic Switches. If the address is one of the neighboring ROVERs, the MAST instructs the switch to switch the cell frame to the designated neighboring ROVER.

Link Encryption

The V-ROVER ASM two trunks terminate into the Link Encryption System 201D. The link Encryption System is an additional layer of security beneath the Application Encryption System that sits under the AAPI as shown in FIG. 6.0.

The Link Encryption System as shown in FIG. 21.0 which is an embodiment of this invention, encrypts all four of the V-ROVER's 40 GBps data streams that comes out from the ASMs. This process ensures that cyber adversaries cannot see Attobahn data as it traverses the millimeter wave spectrum. The Link Encryption System uses a private key cypher between the ROVERs, Protonic Switches, and Nucleus Switches. This encryption system at a minimum meets the AES encryption level but exceeds it in the way the encryption methodology is implemented between the Access Network Layer, Protonic Switching Layer, and Nucleus Switching Layer of the network.

QAM Modem

The V-ROVER Quadrature Amplitude Modem (QAM) 246 as shown in FIG. 21.0 which is an embodiment of this invention, is a four-section modulator and demodulator. Each section accepts a digital baseband signal of 40 GBps that modulates the 30 GHz to 3300 GHz carrier signal that is generated by local Cesium Beam referenced oscillator circuit 805ABC.

QAM Modem Maximum Digital Bandwidth Capacity

The V-ROVER QAM modulator uses a 64-4096-bit quadrature adaptive modulation scheme. The modulator uses an adaptive scheme that allows the transmission bit rate to vary according to the condition of the millimeter wave RF transmission link signal-to-noise ratio (S/N). The modulator monitors the receive S/N ratio and when this level meets its lowest predetermined threshold, the QAM modulator increases the bit modulation to its maximum of 4096-bit format, resulting in a 12:1 symbol rate. Therefore, for every one hertz of bandwidth, the system can transmit 12 bits. This arrangement allows the V-ROVER to have a maximum digital bandwidth capacity of 12×24 GHz (when using a bandwidth 240 GHz carrier)=288 GBps. Taking all four of the V-ROVER 240 GHz carriers, the full capacity of the ROVER at a carrier frequency of 240 GHz is 4×288 GBps=1.152 TBps.

Across the full spectrum of Attobahn millimeter wave RF signal operation of 30-3300 GHz, the range of V-ROVER at maximum 4096-bit QAM will be:

30 GHz carrier, 3 GHz bandwidth: 12×3 GHz×4 Carrier Signals=144 GBps (Giga Bits per second)

3300 GHz, 330 GHz bandwidth: 12×330 GHz×4 Carrier Signals=

15.84 TBps (Tera Bits per second)

Therefore, the V-ROVER has a maximum digital bandwidth capacity of 15.84 TBps.

QAM Modem Minimum Digital Bandwidth Capacity

The V-ROVER QAM modulator monitors the receive S/N ratio and when this level meets its highest predetermined threshold, the QAM modulator decreases the bit modulation to its minimum of 64-bit format, resulting in a 6:1 symbol rate. Therefore, for every one hertz of bandwidth, the system can transmit 6 bits. This arrangement allows the V-ROVER to have a maximum digital bandwidth capacity of 6×24 GHz (when using a bandwidth 240 GHz carrier)=1.44 GBps. Taking all four of the V-ROVER 240 GHz carriers, the full capacity of the ROVER at a carrier frequency of 240 GHz is 4×1.44 GBps=5.76 GBps.

Across the full spectrum of Attobahn millimeter wave RF signal operation of 30-3300 GHz, the range of V-ROVER at minimum 64-bit QAM will be:

30 GHz carrier, 3 GHz bandwidth: 6×3 GHz×4 Carrier Signals=72 GBps (Giga Bits per second)

3300 GHz, 330 GHz bandwidth: 6×330 GHz×4 Carrier Signals=

7.92 TBps (Tera Bits Per Second)

Therefore, the V-ROVER has a minimum digital bandwidth capacity of 7.92 TBps.

Hence, the digital bandwidth range of the V-ROVER across the millimeter and ultra-high frequency range of 30 GHz to 3300 GHz is 72 GBps to 15.84 TBps. The V-ROVER QAM Modem automatically adjusts its constellation points of the modulator between 64-bit to 4096-bit. When the S/N decreases the bit error rate of the received digital bits increases if the constellation points remain the same. Therefore, the modulator is designed to harmoniously reduce its constellation point, symbol rate with the S/N ratio level, thus maintaining the bit error rate for quality service delivery over wider bandwidth. This dynamic performance design allows the data service of Attobahn to gracefully operate at a high quality without the end user realizing a degradation of service performance.

Modem Data Performance Management

The V-ROVER QAM modulator Data Management Splitter (DMS) 248 circuitry which is an embodiment of this invention, monitors the modulator links' performances and correlates each of the four (4) RF links S/N ratio with the symbol rate it applies to the modulation scheme. The modulator simultaneously takes the degradation of a link and the subsequent symbol rate reduction, immediately throttle back data that is designated for the degraded link, and divert its data traffic to a better performing modulator.

Hence, if modulator No.1 detects a degradation of its RF link, then the modem system with take traffic from that degraded modulator and direct it to modulator No.2 for transmission across the network. This design arrangement allows the V-ROVER system to management its data traffic very efficiently and maintain system performance even during transmission link degradation. The DMS carries out these data management functions before it splits the data signal into two streams to the in phase (I) and 90-degree out of phase, quadrature (Q) circuitry 251 for the QAM modulation process.

Demodulator

The V-ROVER QAM demodulator 252 functions in the reverse of its modulator. It accepts the RF I-Q signals from the RF Low Noise Amplifier (LNA) 254 and feeds it to the I-Q circuitry 255 where the original combined digital together after demodulation. The demodulator tracks the incoming I-Q signals symbol rate and automatically adjust itself to the incoming rate and harmoniously demodulate the signal at the correct digital rate. Therefore, if the RF transmission link degrades and the modulator decreased the symbol rate from its maximum 4096-bit rate to 64-bit rate, the demodulator automatically tracks the lower symbol rate and demodulates the digital bits at the lower rate. This arrangement makes sure that the quality of the end-to-end data connection is maintained by temporarily lowering the digital bit rate until the link performance increases.

V-Rover RF Circuitry

The V-ROVER millimeter wave (mmW) radio frequency (RF) circuitry 247A is design to operate in the 30 GHz to 3300 GHz range and deliver broadband digital data with a bit error rate (BER) of 1 part in 1 billion to 1 trillion under various climatic conditions.

mmW RF Transmitter

The V-ROVER mmW RF Transmitter (TX) stage 247 consists of a high frequency upconverter mixer 251A that allows the local oscillator frequency (LO) which has a frequency range from 30 GHz to 3300 GHz to mix the 3 GHz to 330 GHz bandwidth baseband I-Q modem signals with the RF 30 GHZ to 330 GHz carrier signal. The mixer RF modulated carrier signal is fed to the super high frequency (30-3300 GHz) transmitter amplifier 253. The mmW RF TX has a power gain of 1.5 dB to 20 dB. The TX amplifier output signal is fed to the rectangular mmW waveguide 256. The waveguide is connected to the mmW 360-degree circular antenna 257 which is an embodiment of this invention.

mmW RF Receiver

FIG. 21.0 which is an embodiment of this invention, shows the V-ROVER mmW Receiver (RX) stage 247A that consists of the mmW 360-degree antenna 257 connected to the receiving rectangular mmW waveguide 256. The incoming mmW RF signal is received by the 360-degree antenna, where the received mmW 30 GHz-3300 GHz signal is sent via the rectangular waveguide to the Low Noise Amplifier (LNA) 254 which has up to a 30-dB gain.

After the signal leaves, the LNA, it passes through the receiver bandpass filter 254A and fed to the high frequency mixer. The high frequency down converter mixer 252A allows the local oscillator frequency (LO) which has a frequency range from 30 GHz to 3300 GHz to demodulate the I and Q phase amplitude 30 GHz to 3300 GHz carrier signals back to the baseband bandwidth of 3 GHz to 330 GHz. The bandwidth baseband I-Q signals 255 are fed to the 64-4096 QAM demodulator 252 where the separated I-Q digital data signals are combined back into the original single 40 GBps data stream. The QAM demodulator 252 four (4) 40 GBps data streams are fed to the decryption circuitry and to the cell switch via the ASM.

V-Rover Clocking & Synchronization Circuitry

FIG. 21.0 show the V-ROVER internal oscillator 805ABC which is controlled by a Phase Lock Loop (PLL) circuit 805A that receives it reference control voltage from the recovered clock signal 805. The recovered clock signal is derived from the received mmW RF signal from the LNA output. The received mmW RF signal is sample and converted into digital pulses by the RF to digital converter 805E as illustrated in FIG. 21.0 which is an embodiment of this invention.

The mmW RF signal that is received by the V-ROVER came from the Protonic Switch or the neighboring ROVER which are in the same domain. Since each domain devices (Protonic Switch and ROVERs) RF and digital signals are reference to the uplink Nucleus Switches, and the Nucleus Switches are referenced to the National Backbone and Global Gateway Nucleus Switches as illustrated in FIG. 107.0 which is an embodiment of this invention, then each Protonic Switch and ROVER are in effect referenced to the Atomic Cesium Beam high stability oscillatory system. Since Atomic Cesium Beam oscillatory system is referenced to the Global Position Satellite (GPS) it means that all of Attobahn systems globally are referenced to the GPS.

This clocking and synchronization design makes all of the digital clocking oscillator in every Nucleus Switch, Protonic Switch, V-ROVER, Nano-ROVER, Atto-ROVER and Attobahn ancillary communications systems such as fiber optics terminals and Gateway Routers referenced to the GPS worldwide.

The referenced GPS clocking signal derived from the V-ROVER mmW RF signal varies the PLL output voltage in harmony with the received GPS reference signal phases between 0-360 degrees of its sinusoid at the GNCCs (Global Network Control Center) Atomic Cesium Oscillators. The PLL output voltage controls the output frequency of the V-ROVER local oscillator which in effect is synchronized to the Atomic Cesium Clock at the GNCCs, that is referenced to the GPS.

The V-ROVER clocking system is equipped with frequency multiplier and divider circuitry to supply the varying clock frequencies to following sections of the system:

RF Mixed/Upconverter/Down Converter 1×30-3300 GHz
QAM Modem 1×30-3300 GHz signal
Cell Switch 4×2 THz signals
ASM 4×40 GHz signals
End User Ports 8×10 GHz-20 GHz signal
CPU & Cloud Storage 1×2 GHz signal
WiFi & WiGi Systems 1×5 GHz and 1×60 GHz signals The V-ROVER clocking system design ensures that Attobahn data information is completely synchronized with the Atomic Cesium Clock source and the GPS, so that all applications across the network is digitally synchronized to the network infrastructure which radically minimizes bit errors and significantly improved service performance.

V-Rover Multi-Processor & Services

The V-ROVER is equipped with dual quad-core 4 GHz, 8 GB ROM, 500 GB storage CPU that manages the Cloud Storage service, network management data, and various administrative functions such as system configuration, alarms message display, and user services display in device.

The CPU monitors the system performance information and communicates the information to the ROVERs Network Management System (RNMS) via the logical port 1 (FIG. 6.0) Attobahn Network Management Port (ANMP) EXT 0.001. The end use has a touch screen interface to interact with the V-ROVER to set passwords, access services, purchase shows, communicate with customer service, etc.

The Attobahn end user services APPs manager runs on the V-ROVER CPU. The end user services APPs manager interfaces and communicates with the Attobahn APPs that reside on the end user desktop PC, Laptop, Tablet, smart phones, servers, video games stations, etc. The following end user Personal Services and administrative functions run on the CPU:

Personal InfoMail
Personal Social Media
Personal Infotainment
Personal Cloud
Phone Call Services
New Movie Releases Services Download Storage/Deletion Management
Broadcast Music Services
Broadcast TV Services
Online WORD, SPREAD SHEET, DRAW, & DATABASE
Habitual APP Services
GROUP Pay Per View Services
Concert Pay Per View
Online Virtual Reality
Online Video Games Services
Attobahn Advertisement Display Services Management (banners and video fade in/out)
AttoView Dashboard Management
Partner Services Management
Pay Per View Management
VIDEO Download Storage/Deletion Management
General APPs (Google, Facebook, Twitter, Amazon, What's Up, etc.)

Each one of these services, Cloud service access, and storage management is controlled by the Cloud APP in the V-ROVER CPU.

What is claimed is:

1. A mobile device for wirelessly communicating data over a network using millimeter wave technology, the mobile device comprising:
a plurality of ports;
an application programming interface (API);
a memory storing a software application;
an integrated circuit coupled to the plurality of ports, the API, and the memory, said integrated circuit programmed to:
receive a data packet from the network at one of the plurality of ports,
authenticate the data packet,
encapsulate the data packet into a fixed cell frame, wherein the fixed cell frame is a time division multiple access frame, and
transmit the fixed cell frame to the network using millimeter wave technology,
wherein the integrated circuit is coupled to a transceiver configured to transmit and receive a radio frequency (RF) millimeter wave
wherein the RF millimeter wave operates at a frequency between 90 GHz and 3,300 GHz.

2. The mobile device of claim 1, further comprising a switch configured to move the data packet between the plurality of ports at various data rates.

3. The mobile device of claim 1, wherein the integrated circuit executes the software code in order to authenticate the data packet.

4. The mobile device of claim 1, wherein the integrated circuit executes the software code in order to encrypt the data packet.

5. The mobile device of claim 1, wherein the integrated circuit is coupled to a high speed digital modulator and demodulator.

6. The mobile device of claim 1, wherein the integrated circuit is coupled to a clocking and synchronization module.

7. The mobile device of claim 1, wherein the integrated circuit is coupled to a network management module.

8. The mobile device of claim 1, wherein the integrated circuit executes the software code in order to encrypt the data packet, end user application data, the fixed cell frame, or a combination thereof.

9. The mobile device of claim 1, wherein the RF millimeter wave operates at a frequency between 30 GHz and 3,300 GHz.

10. The mobile device of claim 8, wherein the RF millimeter wave is transmitted between a gyro travelling wave amplifier and a RF millimeter antenna repeater amplifier.

11. A mobile device for wirelessly communicating data over a network using millimeter wave technology, the mobile device comprising:
a plurality of ports;
a memory storing a software application;
an application programming interface (API) configured to allow data access to the software application;
a clocking and synchronization module;
a network management module;
a transceiver configured to transmit and receive a radio frequency (RF) millimeter wave; and
an integrated circuit coupled to the plurality of ports, memory, the API, the clocking and synchronization module, the network management module, and the transceiver, the integrated circuit programmed to:
receive a data packet from the network at one of the plurality of ports,
authenticate the data packet by executing the software application,
encapsulate the data packet into a fixed cell frame by executing the software application, wherein the fixed cell frame is a time division multiple access frame,
move the data packet between the plurality of ports at various data rates, and transmit the fixed cell frame to the network using millimeter wave technology,
wherein the RF millimeter wave has a frequency between 90 GHz to 3,300 GHz.

12. The mobile device of claim 11, further comprising a switch, wherein the integrated circuit utilized the switch to move the data packet between the plurality of ports at various data rates.

13. The mobile device of claim 11, wherein the RF millimeter wave has a frequency between 200 GHz to 3,300 GHz.

14. The mobile device of claim 11, wherein the integrated circuit utilizes the transceiver to transmit the fixed cell frame to the network.

15. The mobile device of claim 11, wherein the transceiver is configured to transmit the RF millimeter wave between a gyro travelling wave amplifier and a RF millimeter antenna repeater amplifier.

\* \* \* \* \*